Aug. 21, 1923.
G. F. WITTUM
MAIL ASSORTING MACHINE
Filed July 22, 1911 12 Sheets-Sheet 1
1,465,773
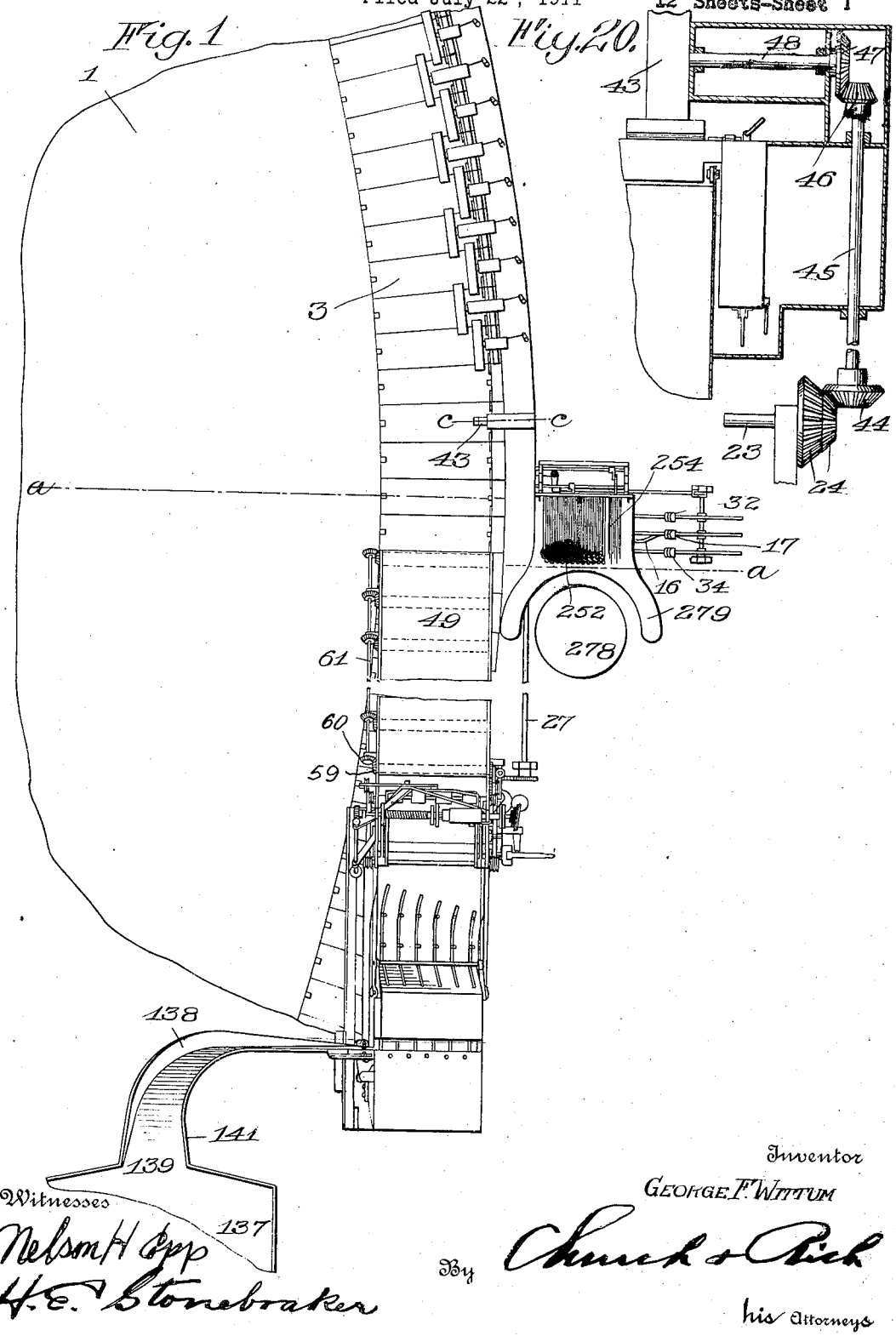

Aug. 21, 1923.
G. F. WITTUM
MAIL ASSORTING MACHINE
Filed July 22, 1911
1,465,773
12 Sheets-Sheet 2
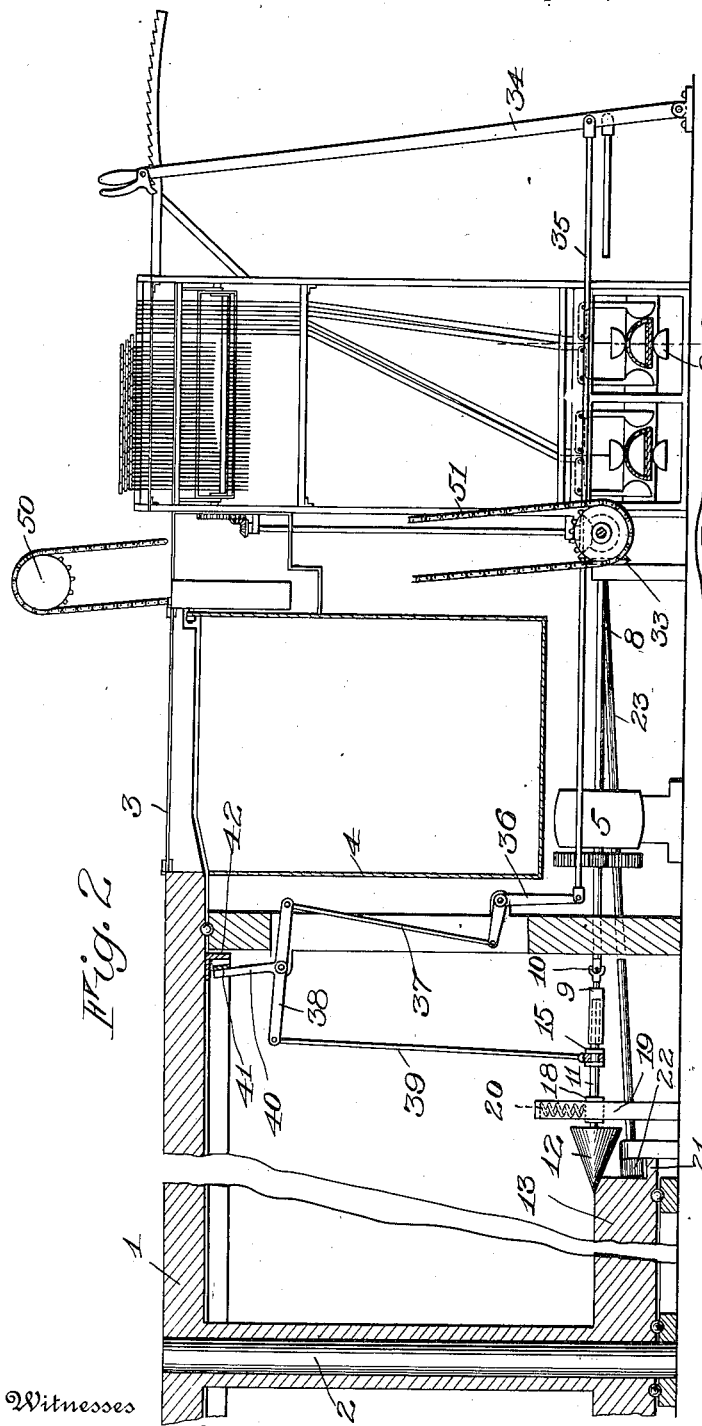
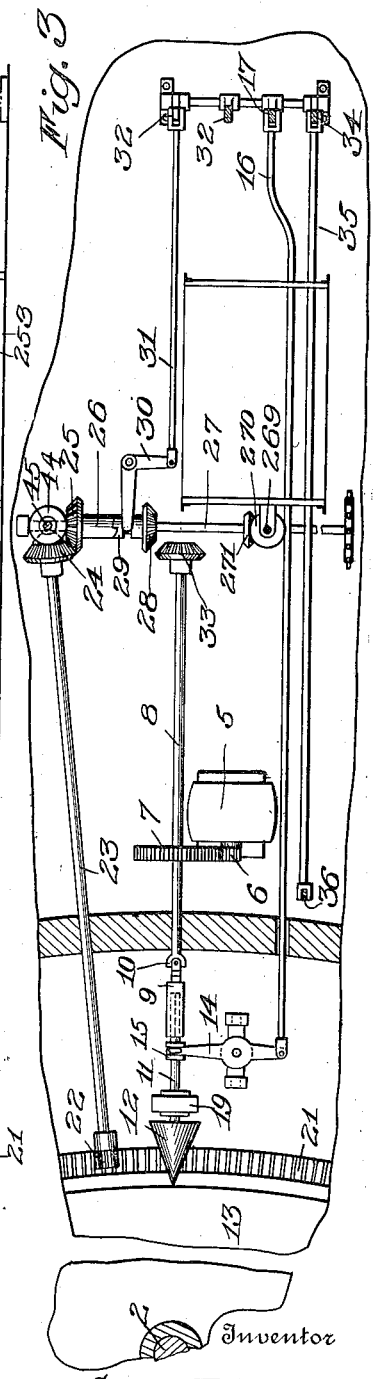
Inventor
GEORGE F. WITTUM

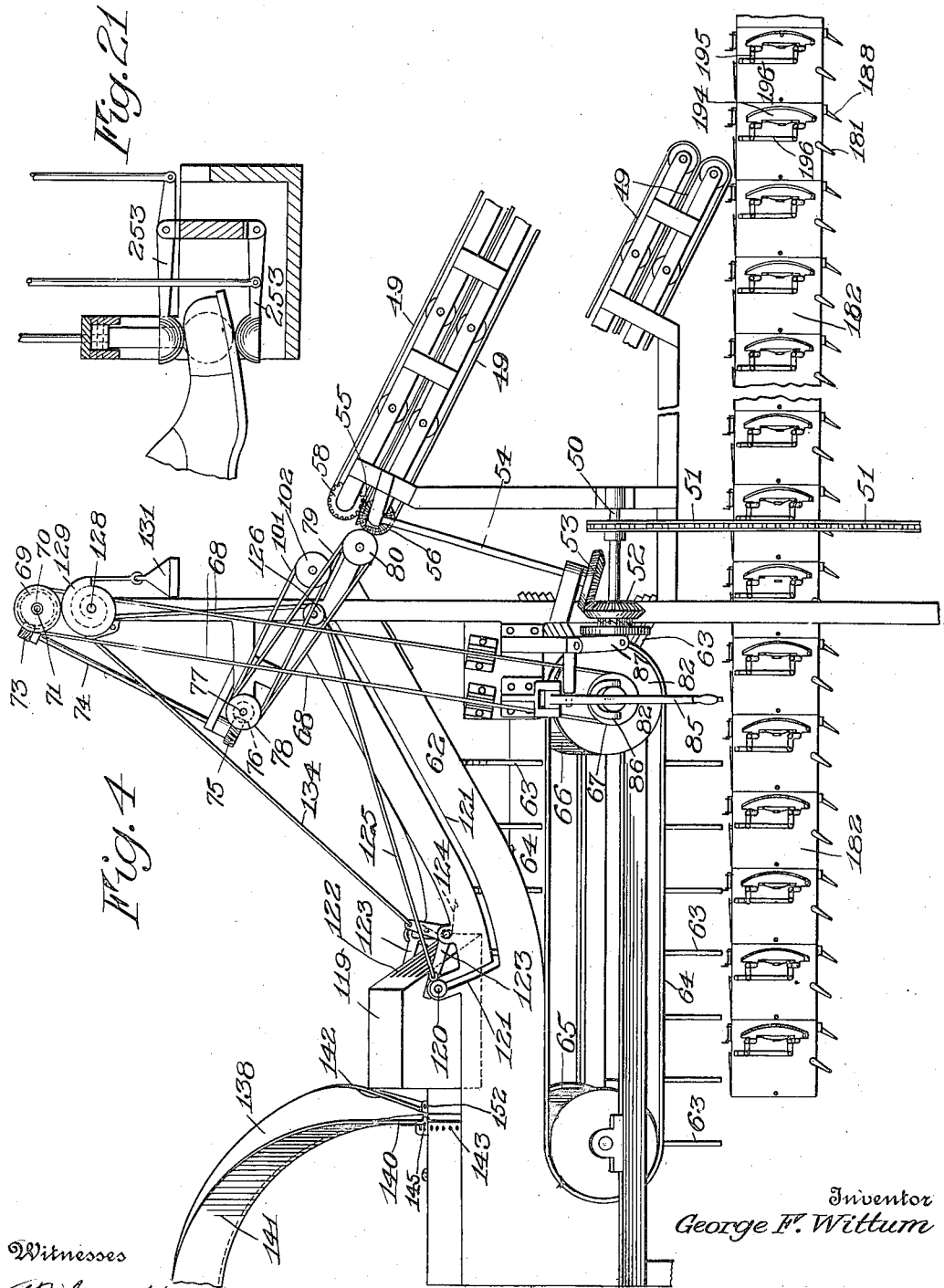

Aug. 21, 1923.  
G. F. WITTUM  
MAIL ASSORTING MACHINE  
Filed July 22, 1911  
1,465,773  
12 Sheets-Sheet 4
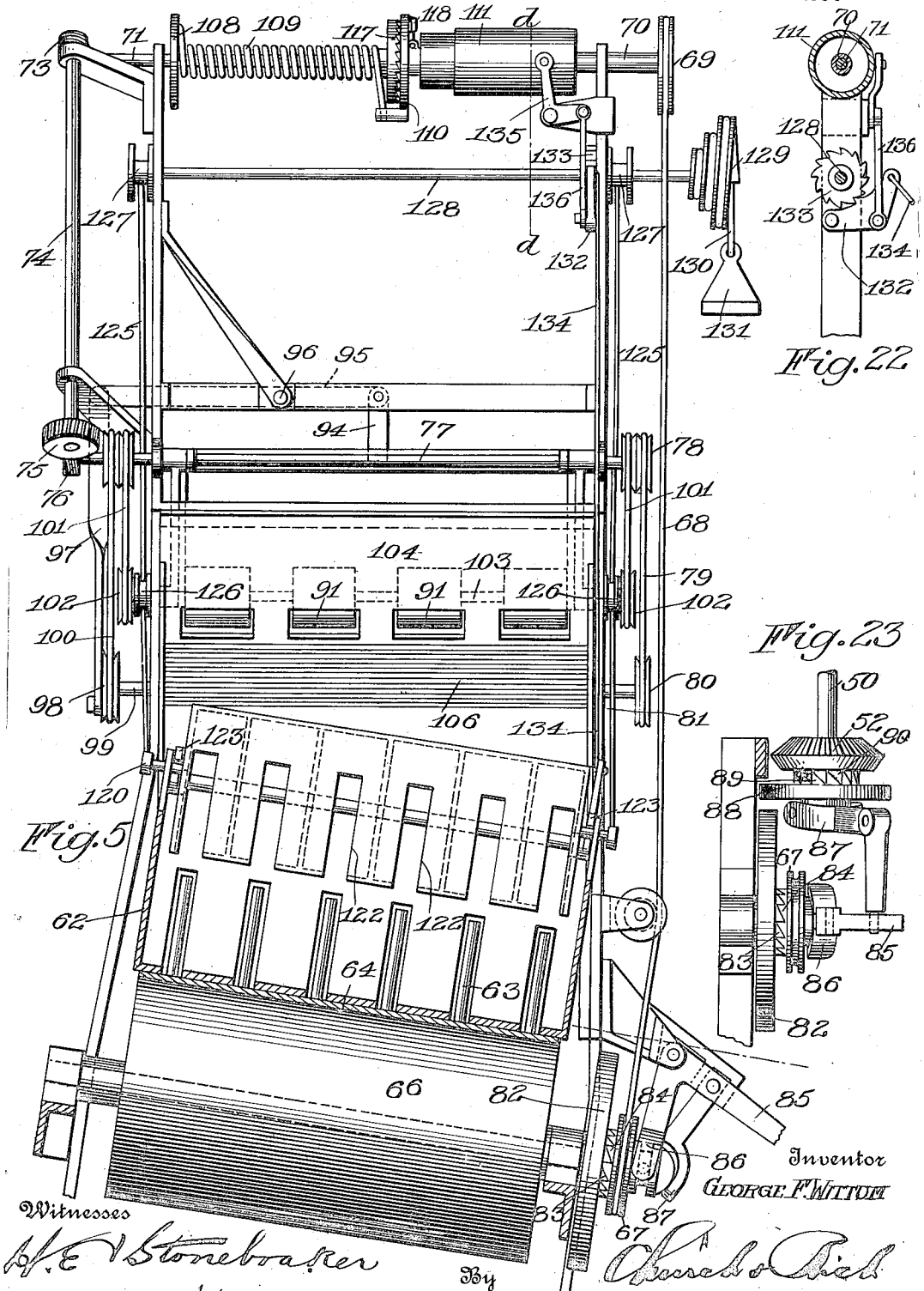

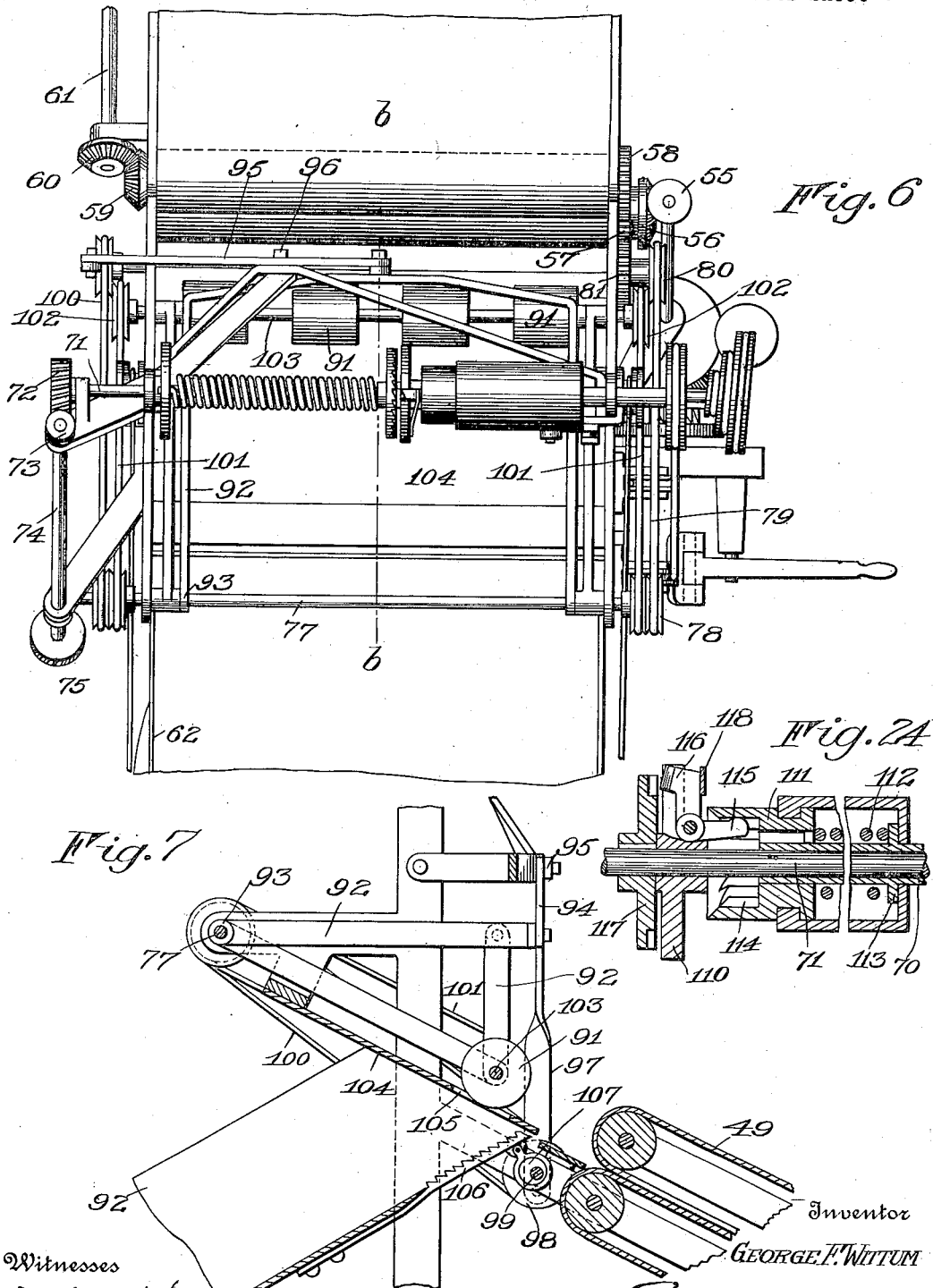

Aug. 21, 1923.  
G. F. WITTUM  
MAIL ASSORTING MACHINE  
Filed July 22, 1911    12 Sheets-Sheet 6
1,465,773
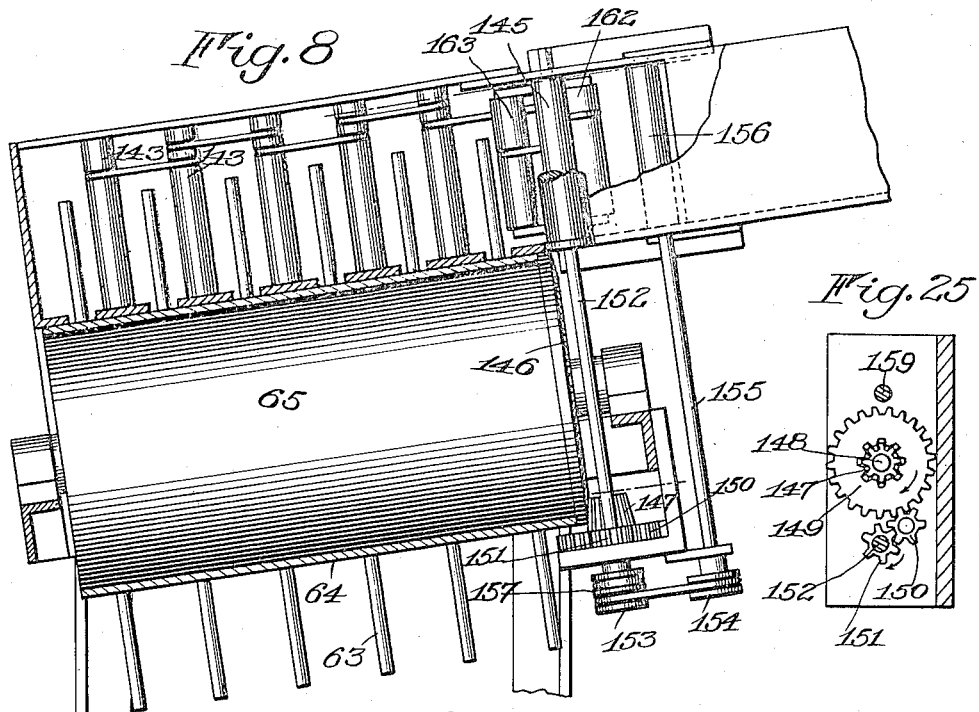
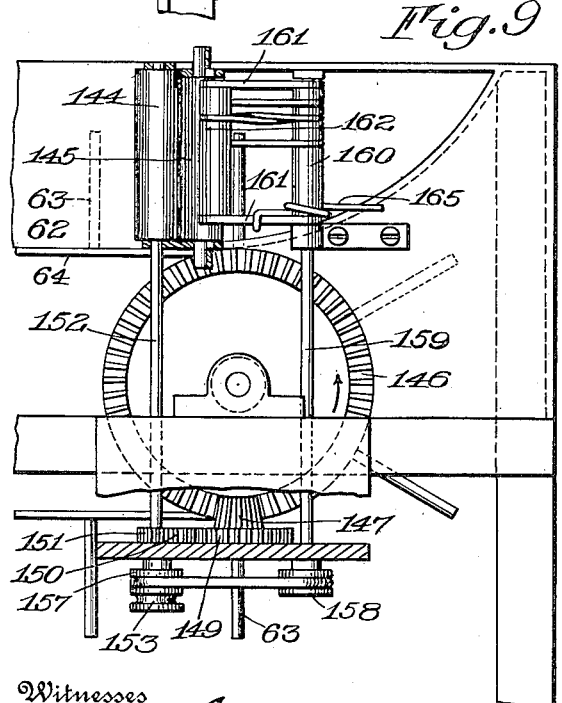
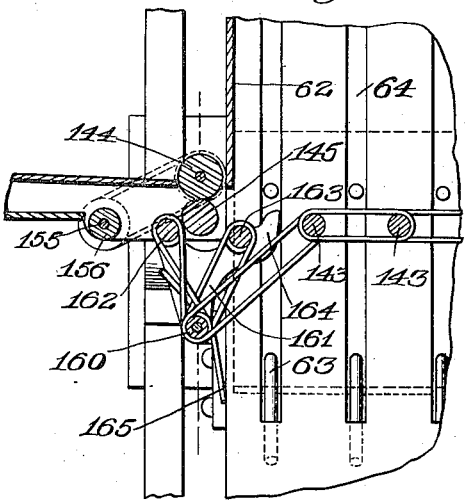
Witnesses  
H. E. Stonebraker  
Nevin H Opp
Inventor  
GEORGE F. WITTUM  
By  
his Attorneys

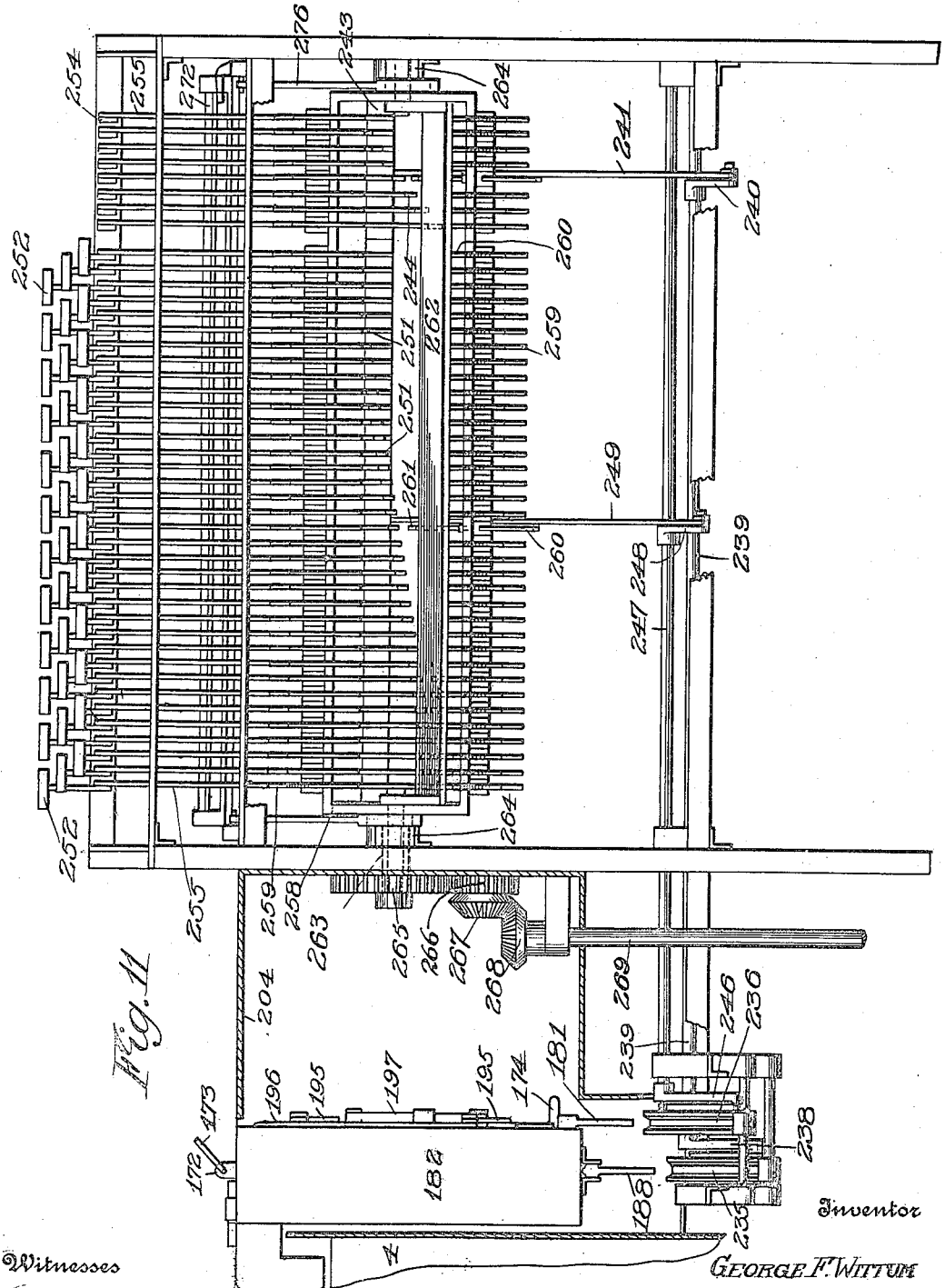

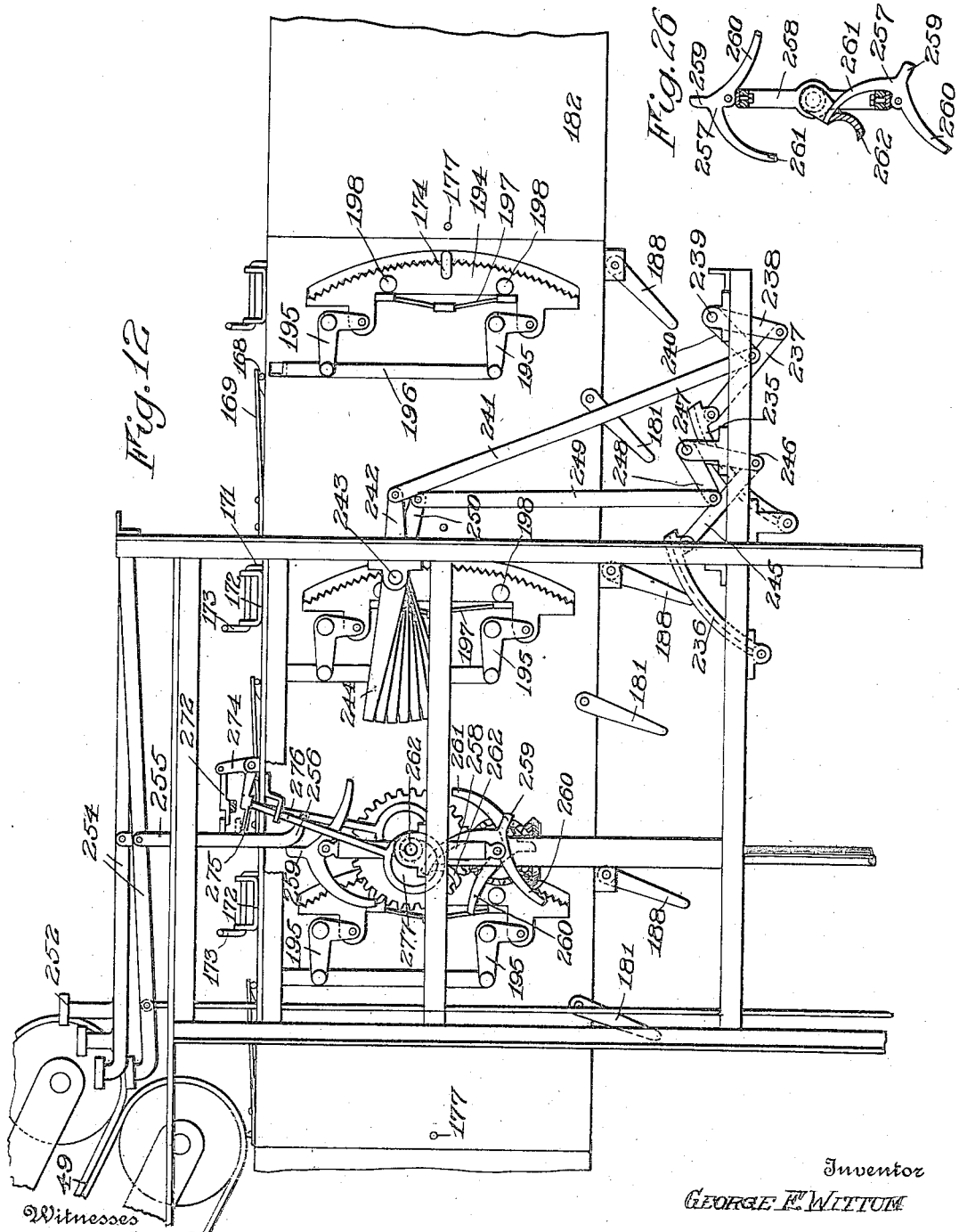

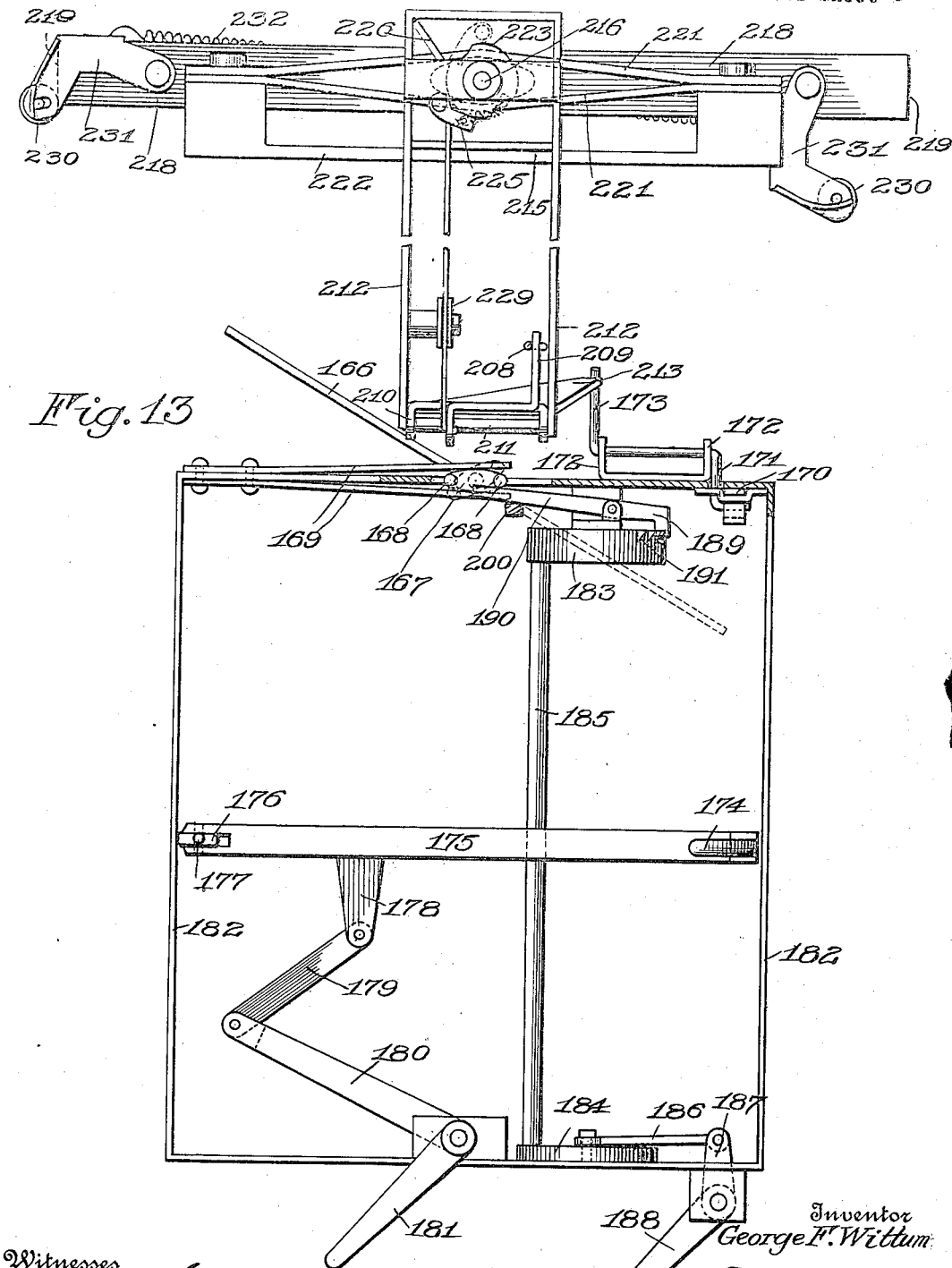

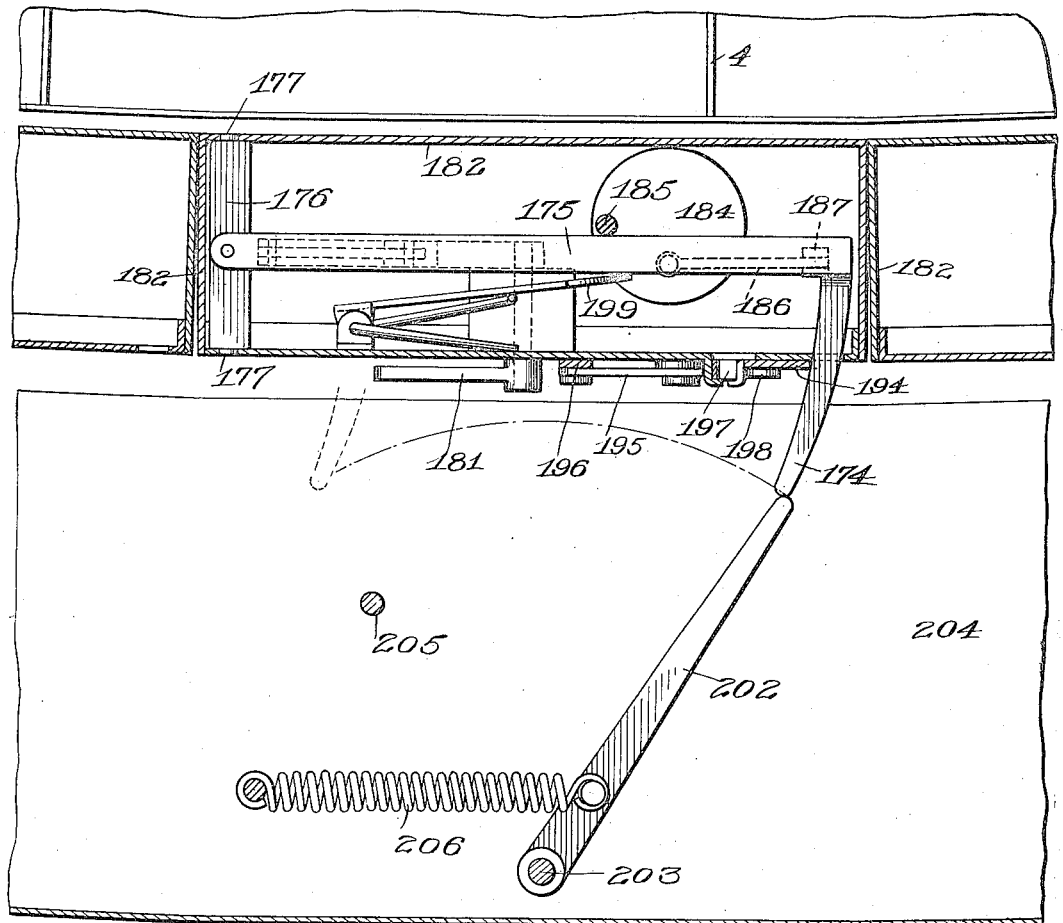
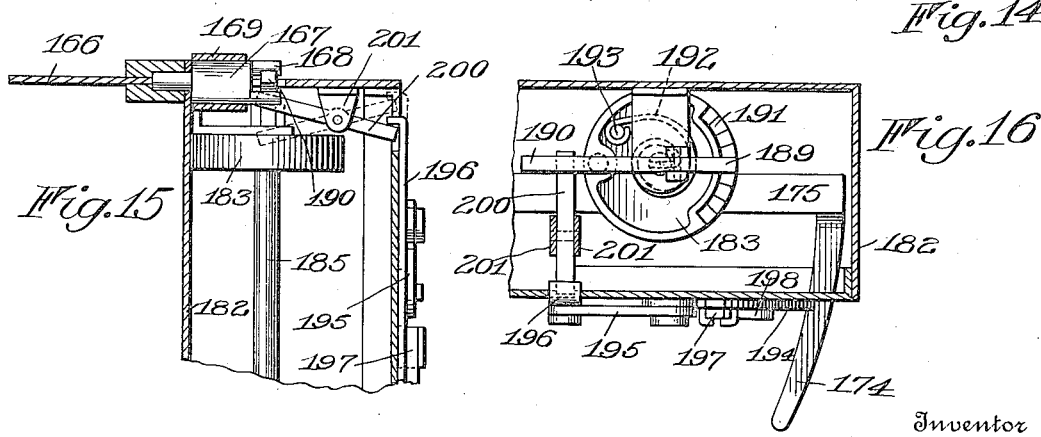

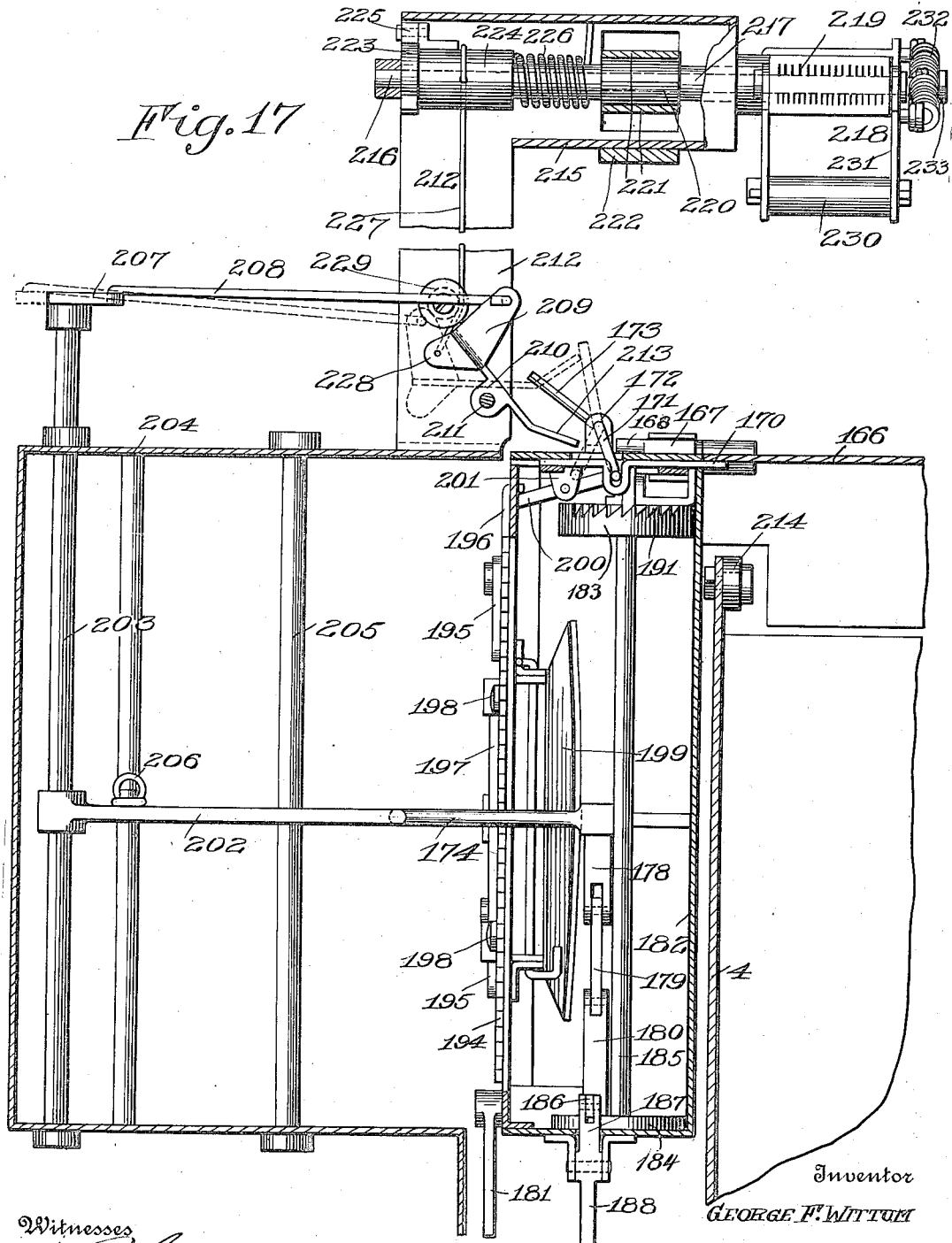

Patented Aug. 21, 1923.

1,465,773

UNITED STATES PATENT OFFICE.

GEORGE F. WITTUM, OF VALLEJO, CALIFORNIA, ASSIGNOR, BY MESNE ASSIGNMENTS, OF ONE-HALF TO MECHANICAL EFFICIENCY COMPANY, A CORPORATION OF DELAWARE, AND ONE-HALF TO THE AUTO MAIL DISTRIBUTOR, INC., OF SYRACUSE, NEW YORK, A CORPORATION OF NEW YORK.

MAIL-ASSORTING MACHINE.

Application filed July 22, 1911. Serial No. 640,040.

*To all whom it may concern:*

Be it known that I, GEORGE F. WITTUM, a citizen of the United States, and resident of Vallejo, in the county of Solano and State of California, have invented certain new and useful Improvements in Mail-Assorting Machines; and I do hereby declare the following to be a full, clear, and exact description of the same, reference being had to the accompanying drawings, forming a part of this specification, and to the reference numerals marked thereon.

The present invention relates to mail assorting machines, and it has for its object to provide a novel construction and arrangement of parts which may be controlled by a single operator, or attendant, whereby letters, being received in bulk, are automatically sorted, cancelled and distributed to different pockets or receptacles according to their destination, each letter being marked with an identifying stamp indicating the particular pocket or receptacle in which it is discharged. To these and other ends the invention consists in certain improvements and combinations of parts all as will be hereinafter more fully described, the novel features being pointed out in the claims at the end of the specification.

In the drawings:

Figure 1 is a top plan view of one embodiment of the machine, the distributing table, and the conveyor leading thereto, being partly broken away;

Figure 2 is a vertical sectional view on the line *a—a* of Figure 1, with parts broken away;

Figure 3 is a view in elevation, partly in section, showing the driving mechanism;

Figure 4 is a side elevation of the machine, the distributing table and the conveyor leading thereto being partly broken away;

Figure 5 is a view in end elevation of the delivering means for supplying letters from the letter chute to the distributing table;

Figure 6 is a top plan view of a portion of the delivering means shown in Figure 5;

Figure 7 is a sectional view on the line *b—b* of Figure 6, showing a portion of the letter track and the arrangement of parts for feeding the letters from the letter track to the conveyor;

Figure 8 is a view in section, partly in elevation, of the letter track, showing the letter engaging devices, and the letter chute leading to the letter track, parts being broken away;

Figure 9 is a side elevation of the parts shown in Figure 8, the letter chute being omitted;

Figure 10 is a transverse sectional view taken through Figure 8;

Figure 11 is a front elevation of the keyboard mechanism and a portion of the letter distributing table;

Figure 12 is a side elevation of a portion of the letter distributing table, and the keyboard mechanism;

Figure 13 is a view in elevation, partly in section, showing one of the tiltable letter supports and parts cooperating therewith carried by the distributing table, together with the identifying stamp for indicating on the letter the particular pocket or receptacle into which it is discharged;

Figure 14 is a transverse sectional view taken through the lower part of Figure 13, showing one of the letter discharging levers, and the corresponding trip arm and cooperating parts mounted on the distributing device;

Figure 15 is a detail sectional view showing a portion of one of the letter supports, and parts cooperating therewith for returning the trip arm to its normal position after the letter is discharged;

Figure 16 is a detail view in transverse section through Figure 15, showing part of the trip arm locking means;

Figure 17 is a vertical sectional view showing a portion of one of the tiltable letter supports and cooperating parts mounted on the distributing table, the corresponding letter discharging lever cooperating with the trip arm, and the stamping mechanism actuated by the discharging member;

Figure 20 is a detail sectional view on the line *c—c* of Figure 1, showing the cancelling stamp and means for operating the same;

Figure 21 is a detail sectional view showing one of the treadles and connections for operating certain of the plungers of the keyboard mechanism;

Figure 22 is a detail sectional view on the line *d—d* of Figure 5;

Figure 23 is a detail view in elevation showing the clutch mechanism which enable the letter engaging devices to be operated directly from the driving shaft, when it is desired to move the letter engaging devices more quickly than under normal conditions;

Figure 24 is a detail sectional view of the clutch employed for throwing the letter engaging devices out of operation when the supply of letters is exhausted in the letter track;

Figure 25 is a detail view of the gearing employed for the parts shown in Figures 8, 9 and 10, and Figure 26 is a detail view of the revolving lever carrying frame, and levers movably mounted thereon, of the keyboard mechanism.

Similar reference numerals throughout the several figures indicate the same parts.

Figure 18:
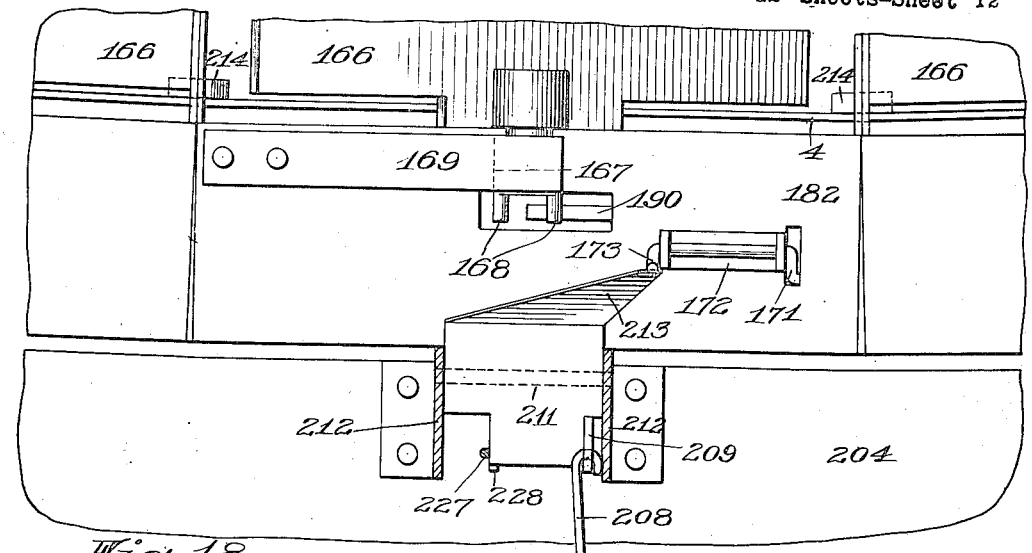
Figure 18 is a top plan view, showing one of the tiltable letter supports in discharging position, and the means for releasing the same.

In the particular embodiment of my invention disclosed hereby, I provide a distributing conveyer embodying an endless series of individual mail-unit movers. carriers or supports continuously moving in an endless path past loading or receiving, inspection, and a series of discharge stations; mail unit discharging means being provided for said discharge stations, respectively, the discharging means for each station being distinctive with respect to the remaining discharging means, said conveyer being provided with a series of adjustable selective mechanisms, one for each mail unit carrier, determining the discharge stations at which such units will be delivered through cooperation of selective mechanisms with the discharging means of such discharge stations; setting up mechanism common to all of said selective mechanisms being provided to set the same to predetermine the delivery points of the mail units; delivering or feeding mechanism being provided for automatically and successively feeding the mail units to said carriers while they are under movement past such feeding mechanism thereby establishing said carrier loading or receiving station; means being provided at the operator's station for manual control or adjustment of said setting up mechanism to individually set up the selective mechanisms as they move past in succession; the operator's station being arranged to enable the operator to read the address of each unit on its carrier while or after moving from the loading station thereby establishing said inspection station so that the operator can actuate the setting up mechanism according to said address before the particular selective mechanism predetermining the discharge station at which said letter will be delivered, has moved into position to be operated on by said setting up mechanism, however, I do not wish to so limit all features of my invention.

The distributing conveyer and its driving means

In the embodiment of the invention, as herein shown and described, the distributing conveyer includes a table 1 which is continuously rotatable about a central bearing 2 and provided with a series of movable letter supports 3 constituting letter movers or carriers which are adapted to discharge the letters into a series of corresponding pockets or receptacles 4 constituting discharge stations. The table is rotated by means of a motor 5, the driving shaft of which carries a pinion 6 meshing with the gear wheel 7 fast on the shaft 8, the latter being connected to a sleeve 9 through a universal joint 10. Slidably engaging the sleeve 9 and arranged to rotate therewith is a stub shaft 11 which carries the friction cone 12, the latter being positioned for engagement with a friction surface at the edge of the base 13 of the distributing table. By means of the sleeve 9, the stub shaft 11 may be moved longitudinally to effect varying speeds of movement for the distributing table, such adjustment being obtained by means of a pivoted arm 14 in engagement with a collar 15 on the shaft 11 and connected to a rod 16 which may be operated in any suitable manner, as by means of the lever 17. The friction cone 12 is held in yieldable engagement with the distributing table through the instrumentality of a vertically movable bearing 18 arranged in the housing 19 and normally held in a lowered position by means of the spring 20. Arranged on the base 13 of the distributing table is a gear face 21 with which engages the pinion 22 mounted on the shaft 23, the latter carrying at its opposite end the bevel gear 24 normally engaged by the bevel gear 25 which is carried by the sleeve 26, the latter being loosely mounted on the shaft 27. The several parts of the machine to be hereinafter described derive their movement from the shaft 27 to which is feathered a bevel gear 28 carried by the sleeve 29 which has a clutch connection with the sleeve 26 and is longitudinally movable on the shaft 27 by means of the pivoted bell crank 30, connected by a rod 31 to the controlling lever 32. Ordinarily, the shaft 27 is operated from the gear face 21 through the parts just described, but under certain conditions, it is desired to operate shaft 27 while the distributing table is at rest, as for instance in starting the machine, this being effected by lifting the friction cone 12 out of engagement with the base 13 of the distributing table, and moving the sleeve 29 longitudinally of shaft 27 until the gear 28 engages the bevel gear 33 mounted on the shaft 8, thus driving the shaft 27 directly from the motor, and thereby securing an increased speed. Lifting of the friction cone 12 may be effected in any desirable manner, as by means of the lever 34 to which is pivoted the connecting rod 35, to which is pivotally connected the bell crank 36, the latter being operatively connected to the stub shaft 11 by means of the rod 37, lever 38, and the connecting rod 39. The lever 38, which is suitably pivoted to the stationary frame work of the machine, carries an arm 40 on which is mounted a brake shoe 41, the latter being adapted to engage a flange 42 on the lower face of the distributing table so as to effect a quick stoppage of the table when the motor is disconnected by lifting of the friction cone 12.

*Letter cancelling mechanism.*

The cancelling stamp is designated at 43 and is operated from the bevel gear 24 by means of the bevel gear 44 fixed on the shaft 45, which carries at its upper end a bevel pinion 46, the latter being arranged for engagement with the bevel gear 47 mounted on the shaft 48, which carries the cancelling stamp 43 at its opposite end, so as to engage the letters as they move therebeneath when supported upon the distributing table.

*Mail unit separating and feeding mechanisms for automatically delivering units to the distributing conveyer.*

The mail is supplied to the distributing table by suitable delivering means, which, as illustrated in the present embodiment of the invention, includes a pair of endless conveyors 49 adapted to hold the letters therebetween and carry them to the distributing table and constitutes a feeder or feed mechanism for separating the mail or other units and successively delivering the units to the moving conveyer approximately in the direction of movement of said conveyer and so that each unit assumes an approximately horizontal position on said conveyer with its addressed face uppermost and exposed for reading. The conveyors 49 are actuated from the shaft 50 which is connected to the shaft 27 by means of sprockets on the respective shafts, and chain 51. The shaft 50 carries the bevel gear 52, which is loosely mounted thereon and arranged to normally rotate with the shaft 50 for a purpose to be hereinafter made clear, said bevel gear 52 being normally in engagement with the bevel gear 53 carried by shaft 54, at the upper end of which is mounted the bevel pinion 55 which engages the gear 56 mounted on the end of one of the rollers about which the lower conveyor 49 is arranged to travel.

Said roller is provided with a gear 57 which engages a similar gear 58 on one of the rollers about which the upper conveyor travels, the last mentioned roller carrying the bevel pinion 59 at its opposite end to engage the bevel gear 60 which is carried by the shaft 61, the latter being arranged to rotate the several rollers about which the conveyors travel as will be apparent from Figures 1, 4 and 6.

The letters are received onto the conveyor from the letter track 62, from which they are ejected one by one by a mechanism which will presently be explained. The letter track may be constructed and arranged in a number of ways, and in a preferred embodiment as herein shown and described, it extends upwardly to the conveyor from a lower level at which the letters enter the track, the letters being moved upwardly along the track by suitable letter engaging devices, which, in the present instance, are illustrated as pins 63 carried by the endless belt 64 which travels about the rolls 65 and 66, which may be rotated in any suitable manner. To this end, in the present embodiment, the roll 66 is mounted on a shaft which carries the pulley 67 connected by a table 68 to the pulley 69 which is fixed on a sleeve 70, the arrangement being such that the sleeve 70 normally rotates with the shaft 71, the latter carrying the worm gear 72 which engages worm 73 mounted at the upper end of the shaft 74 which carries at its lower end the worm gear 75. Arranged for engagement with the worm gear 75 is a worm 76 which is mounted on the shaft 77, the latter carrying at its opposite end the pulley 78 which is connected by the cable 79 with the pulley 80 fixed on a shaft 99 carrying the gear 81 which is arranged for engagement with the previously mentioned gear 57. In this manner, motion is transmitted to roll 66, under normal conditions, from shaft 50, through shafts 54, 77, 74 and 71 to the cable 68, the intermediate gearing being so proportioned as to effect the proper reduction of speed for moving the letter engaging devices when the machine is operated. At the beginning of the operation of the machine, and before any letters are being ejected to the conveyor, it is desirable to fill the letter track quickly, and to this end I may obtain a direct connection between the power shaft 50 and roll 66, this result being obtained in the present embodiment by means of the friction disc 82 which is fixed on the shaft with roll 66 and carries a clutch face 83 at one side. The pulley 67 carries a cooperating clutch face 84 by which it normally engages the clutch face 83 to effect rotation of the shaft, and roll 66. When it is desired to operate roll 66 by a direct drive from the power shaft, the pulley 67 may be shifted out of engagement with the clutch face 83 by means of the lever 85, the operation of which effects simultaneous movement of the yokes 86 and 87, the latter being connected to a sleeve arranged on shaft 50 and carrying friction disc 88 having a clutch face 89 at one side thereof arranged for engagement with a cooperating clutch face 90 on the bevel gear 52. When the parts are in the position shown in Figure 23 the bevel gear 52 is rotated with shaft 50 and the letter engaging devices are moved along the letter track at slow speed as already pointed out, and when the lever 85 is operated to shift the yokes 86 and 87, the bevel gear 52 runs idle on shaft 50 and friction disc 88 is moved into engagement with the cooperating friction disc 82, by which the roll 66 is rotated at an increasing speed.

The letters are received in the letter track standing on edge, in a manner that will be described hereinafter, being held in such position and moved along the track by the pins 63 on the endless belt 64, the track being provided with suitable slots, or cutaway portions, through which the pins 63 project, and in order to insure the proper positioning of the letters within the track, the latter is horizontally inclined at its lower portion, as shown in Figures 4 and 5, so that the letters will be caused to engage the lowermost side wall of the track. The letter track is formed so that its bottom gradually approaches a level position, whereby when the letters reach the upper end of the letter track their upper and lower edges are in horizontal planes. At the upper end of the letter track, the letters are engaged and ejected singly by a suitable mechanism which, in the present embodiment, includes a series of rollers 91 mounted on an oscillating frame 92 pivoted at 93 and connected to a link 94 which is pivoted to the lever 95, the latter being pivotally mounted at 96 and arranged to be oscillated by the connecting rod 97 which is eccentrically pivoted to the pulley 98 fixed on the shaft 99, the latter being driven from shaft 77 by means of the driving connections 100. The rollers 91 are continuously rotated through the instrumentality of driving connections 101 leading from shaft 77 and engaging the pulleys 102 on the shaft 103 which carries the rollers 91. Extending over the upper end of the letter track is a spring plate 104 provided with openings 105 through which the rollers 91 project to engage the uppermost letter and eject the same onto the conveyor, this operation being repeated at each oscillation of the roller-carrying frame 92. In order that the letters may be ejected one by one from the letter track, and to the end that all but the uppermost letter will be retained within the letter track, there is provided a device which, in the present embodiment, includes a yieldably supported oscillatory rack bar 106, the teeth of which are so formed that the letters are slightly separated as they approach the top of the letter track, the pressure of the lower letters causing the uppermost letter to be ejected by the rollers 91 at each movement of the rack bar 106, such movement being effected by means of an eccentric 107 arranged on the shaft 99 and suitably connected to the upper end of the rack bar 106 so as to cause a back and forth movement of the same at each rotation of the shaft 99.

Owing to the variations in the thickness of different letters and the resulting variation in the pressure exerted on the letters in the track, it is desirable to provide means for enabling a slight automatic yielding of the letter engaging devices when required, and to this end, in the present embodiment, there is provided a yielding connection between the shaft 71 and sleeve 70 which carries the pulley 69, said yielding connection comprising a disc 108 fixed on the shaft 71 and having connected thereto the coil spring 109 which surrounds the shaft and is in turn connected to the disc 110 which is loosely mounted on the shaft 71. Feathered to the sleeve 70, and longitudinally mounted thereon, is a clutch 111 which is held normally in the position shown in Figure 24 by means of the spring 112 which engages the collar 113 formed on the sleeve 70. The clutch 111 is provided with an interiorly formed clutch face 114, and arranged to cooperate therewith is the key 115 pivotally mounted on the disc 110. The key 115 is provided with an upwardly and outwardly extending arm 116 which is arranged for engagement with teeth formed on the disc 117 fixed on the shaft 71, and adapted to cooperate with the arm 116 in a manner which will presently be described, said arm being engaged by the leaf spring 118 which tends to force it into engagement with the locking disc 117. Under normal conditions the parts are in the position shown in Figure 24, whereby the shaft 71 transmits motion to pulley 69 and thence to the letter engaging devices, the latter being permitted to yield slightly by reason of the spring connection just described.

When the letters are exhausted in the lower part of the letter track, it is desirable to have means, automatically operated, for moving the few letters remaining in the track to the top thereof for ejecting onto the conveyor, and to this end, in the present embodiment, there is provided a follower 119 arranged for movement upwardly along the letter track, the follower being provided with guides 120 which engage the slots 121 formed in the sides of the letter track. The follower is provided with slots, or cutaway portions 122, to permit passage of the letter engaging pins through the follower as the latter is moved along the letter track, the follower normally assuming the position shown in Figure 4, resting on top of the letters as they move along the track. The follower is forced downwardly onto the track when the supply of letters is exhausted in the lower part thereof, by means of the spring controlled arms 123 which engage the guides 120 and are held thereagainst by means of the spring 124. Connected to the guides 120 are flexible connections 125 which lead around the pulleys 126 and are connected at their upper ends to the sheaves 127 fixed on the shaft 128 which carries at its outer end the spiral pulley 129. A cable 130 is secured to the smaller end of the spiral pulley 129 and carries at its outer end the weight 131 which tends to unwind the cable 130 and thus rotate the shaft 128, causing a simultaneous winding of the connection 125 which leads to the follower. In this manner, when the letters are exhausted in the lower part of the letter track, the follower drops under the action of spring arms 123, and the weight 131 comes into play so as to draw the follower upwardly along the letter track until the last letter is ejected therefrom. As the follower moves along, the number of letters in the track is constantly becoming less, and the amount of pressure required to be exerted against the letters becomes correspondingly less, and it is to this end that the spiral pulley 129 is provided, so that as the cable 130 unwinds the leverage point approaches the center of the wheel and thus decreases the effect of the weight in proportion to the upward movement of the follower, so as to exert a constantly decreasing pressure on the letters. The shaft 128 is normally locked by means of the pawl 132 which engages the ratchet wheel 133 fixed on the shaft. The pawl 132 is connected to spring arm 123 by means of the cable 134 so that when the follower drops into the letter track, the cable 134 is pulled by the lowering of spring arm 123 thereby effecting unlocking of the shaft 128 and consequent movement of the follower along the letter track.

Simultaneously with the movement of the follower into the letter track, it is desirable that the movement of the latter engaging devices be automatically stopped, and to this end, there is provided an automatic unclutching means which comprises a bell crank 135 connected to the pawl 132 by means of a link 136, the other arm of the bell crank having pivotal connection with the clutch 111 so as to move the latter longitudinally of the shaft 71 and out of engagement with the key 115. Thus, when the pawl 132 is operated by the lowering of the follower, the sleeve 70 is released from movement with the disc 110 by the disengagement of the key 115 and clutch face 114. At the same time the spring 118 serves to throw the arm 116 into engagement with the locking disc 117 in order to hold the spring 109 under the desired tension until it is desired to move the letter engaging devices again, which may be effected by the reverse action of that just described.

The letters are fed to the letter track from a hopper 137 into which they are thrown in bulk. Leading from the hopper 137 to the letter track is the letter chute 138 which connects with an opening in the upper side of the letter track, as shown in Figures 1 and 4. The letter chute is constructed so that a letter may be placed in the hopper in a flat position and be delivered to the letter track on edge, and to this end, the bottom 139 at the top of the letter chute forms the side 140 at the lower end, the side wall 141 merging into the bottom 139 to form the side 140 of the chute at the lower end, the other side wall being designated at 142. In this manner, a letter is received by the letter track at the lower end thereof in a standing position on its long edge, ready to be moved along by the letter engaging devices previously described. Suitable means are provided for properly moving the letters from the lower end of the letter chute onto the letter track and for supporting them thereon, and to this end, in the present embodiment, there are provided a plurality of rotary rolls 143 arranged at the rear end of the letter track and intermediate the paths of movement of the letter engaging pins, as shown clearly in Figure 8. Provision is made for rotating the rolls 143 in a direction so as to move the letters toward the lower edge of the letter track, and arranged at the lower end of the letter chute 138 are a pair of cooperating rolls 144 and 145 which normally rotate in a direction to effect movement of the letters onto the letter track to engage the rolls 143. For effecting movement of the parts just mentioned, the end of the roll 65 is provided with the bevel gear 146 which meshes with a bevel pinion 147 fixed on the shaft 148, the latter carrying the gear wheel 149 which engages an idler pinion 150, the latter meshing with pinion 151 secured on the shaft 152, on which is also mounted the letter feeding roll 144. Secured to the shaft 152 is a pulley 153 from which a suitable driving connection leads to pulley 154 mounted on the shaft 155 which carries the feeding roll 156 at its upper end. Also secured to the shaft 152 is a pulley 157 from which a suitable driving connection leads to the pulley 158 mounted on the shaft 159 which carries the roll 160 from which motion is transmitted through suitable driving connections to the rolls 143, as shown in Figures 8 and 10. Normally, the feeding rolls 144 and 145 act to feed the letter from the letter chute to the letter track, but when the letter engaging pins, during their movement along the letter track, come opposite the opening from the letter chute, it is desirable to stop the feed of the letters long enough to permit the letter engaging pins to pass this point, and to withdraw from the letter track a letter that may have been partially fed from the letter chute, and for accomplishing such purpose, in the present embodiment, means are provided for reversing the movement of the roll 145. To this end, there is pivotally mounted on the shaft 159 a frame 161 in which are journalled the rolls 162 and 163, the turning of said rolls being effected by driving connections with the roll 160, as clearly shown in Figures 9 and 10, the arrangement being so that said rolls 162 and 163 move in opposite directions. Normally, the roll 162 engages the roll 145 so as to move the latter to the right, as shown in Figure 10, and when it is desirable to withdraw a letter which has been partially fed to the letter track, roll 162 is moved out of engagement and roll 163 moved into engagement with roll 145 so as to reverse the direction of rotation of the latter, and to this end, the frame 161 carries the projection 164 arranged in the path of movement of the letter engaging pins so that the frame 161 will be oscillated, and the movement of the roll 145 reversed, while the letter engaging pins are passing the letter opening. The oscillatory frame 161 is returned to its normal position by means of a suitable spring 165.

In the operation of the letter distributing means, mail being furnished in bulk to the hopper, the letters move downwardly and reach the lower end of the hopper positioned on their long edge, and are there engaged, first by the roll 156 and then by the pair of rolls 144 and 145, being thence carried onto the letter track and held between the rolls 143 and the letter engaging pins in advance thereof. The letters are fed along the letter track, as many as can be conveniently accommodated between the successive sets of engaging pins on the endless driving belt, which serve to force the letters upwardly along the letter track until they reach the top of the latter where they are engaged by the devices previously described which serve to eject, successively, the uppermost letter from the letter track onto the conveyor, on which it is carried downwardly to the distributing device, which serves to support and discharge the letters in a manner that will now be described.

*The discharge mechanisms and the selective mechanisms controlling the same.*

The distributing table, which has previously been described in a general manner, is provided with a series of movable letter supports, which are preferably rotatably mounted, and are provided with cooperating elements for holding and releasing the same, and for convenience in the present description, there will be described only one of the letter supports and the parts cooperating therewith, these being duplicated around the distributing table. The letter is received by the distributing table, and rests on a tiltable or rotary support or carrier 166 which is provided at one end with the cam member 167 carrying the pins 168 for a purpose that will be made clear hereinafter, and arranged between a pair of leaf springs 169, as shown clearly in Figure 13, the latter serving normally to hold the cam member in the position shown in full lines in Figures 13, the letter support or carrier being tilted. When the letter carrier is positioned level with the top of the distributing table, as shown in Figures 15 and 17, the cam member 167 is in the position shown in dotted lines in Figure 13. The letter carrier is held in level position, by means of suitable locking means, which, in the present embodiment, comprises the slidable latch 170 arranged for lateral movement in suitable guides, and adapted to be operated by the lever 171 pivotally mounted in suitable standards 172 and carrying the upstanding arm 173 by which it is actuated in a manner that will presently be fully set forth. Carried by the distributing table is the trip arm 174 which is arranged to permit tilting of the letter carrier at the proper receptacle, and to this end, the trip arm 174 may be adjusted to any one of a number of different positions, corresponding to the number of letter pockets or receptacles. To effect the desired end, in the present embodiment, the trip arm is carried on the bar 175 which is pivotally mounted for horizontal movement on a support 176, the latter being horizontally pivoted at 177, whereby to secure both vertical and horizontal adjustment of the bar 175. Carried by the latter is a downwardly extending ear 178 to which is pivoted a link 179, the latter being pivotally connected to bell crank 180 which carries the downwardly projecting arm 181, the latter constituting one of the setting levers for the trip arm 174. The trip arm just described, together with the setting lever and the remaining positioning devices, are housed within the casing 182, secured to the distributing table, and I will now describe the remaining parts of the positioning devices by which horizontal adjustment of the trip arm is obtained, vertical adjustment being secured by the actuation of the setting lever 181 already mentioned. Rotatably mounted at the top and bottom of the casing 182 are a pair of discs 183 and 184 which are connected by a vertically extending rod 185 eccentrically secured to said discs, as shown in Figures 13 and 14. Also eccentrically connected to the lower disc 184 is a link 186 which connects with the bell crank 187 carrying the remaining setting lever 188, by the actuation of which horizontal adjustment of the trip arm is obtained. It will be noted that the rod 185 lies adjacent to the bar 175 so that as the discs are turned, said bar will be moved laterally a distance corresponding to the extent of movement of the setting lever 188. The rod 185 is held in the position to which it is moved by means of the gravity pawl 189, which carries the tail piece 190 and is arranged for engagement with the ratchet teeth 191 formed on the upper edge of the disc 183. The rod 185 may be returned to normal position in any suitable manner, and in the present embodiment, this is effected by means of the spring 192 connected at one end to a pin 193 mounted on the disc 183, and at its opposite end to the shaft on which the disc is journaled, or, in any other suitable manner. The trip arm 174 is held in the vertical position to which it is adjusted through the instrumentality of a laterally movable rack plate 194 which is mounted on a pair of bell cranks 195 connected to the upwardly extending bar 196, for a purpose which will presently be explained. The rack plate 194 is retained in its normal locking position by means of the engaging spring 197, and is guided on the pins 198 which are carried by the casing 182. In Fig. 12, the slots in the rack plate 194 that receive pins 198, are covered by the heads of said pins. As the trip arm is moved upwardly, the spring pressed rack plate serves to retain the same in the position of desired adjustment until the parts are released, after the letter support has been tilted to discharge its letter, whereupon the rack plate is moved away from the trip arm in a manner that will be hereinafter described, said trip arm falling by gravity to its normal position and being returned to its normal point of lateral movement by the spring supported plate 199 which engages the bar 175.

The bar 196, to which the bell cranks 195 are pivoted, is provided at its upper end with a right angular portion adapted to engage one end of the lever 200 which is centrally pivoted to the lugs 201, the opposite end of said lever being arranged beneath the tail piece 190, the latter extending beneath one of the pins 168 on the cam 167, so that as the letter carrier is rotated in a manner which will presently be described, said pin 168 engages and depresses the tail piece 190 thereby releasing the disk 183, and at the same time elevating the bar 196 through the lever 200 so as to move the rack plate 194 away from engagement with the trip arm 174, which is then free to return to its normal position.

Figure 19:
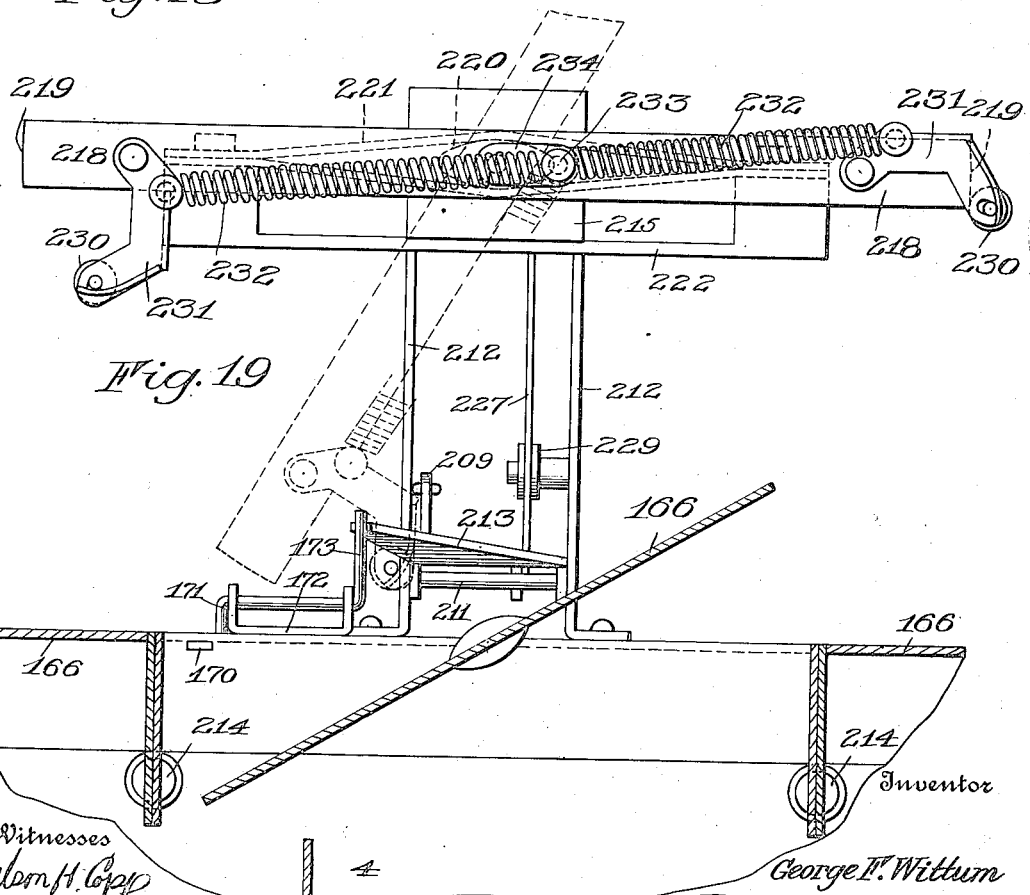
Figure 19 is a view in side elevation, partly in section, showing one of the tiltable letter supports in discharging position, and the stamping mechanism for indicating on the letter the pocket or receptacle into which it is discharged.

The trip arm having been adjusted by the actuation of the setting levers before mentioned, it remains in such position until the letter carrier controlled thereby reaches the corresponding letter pocket or receptable, at which point said trip arm engages suitable letter discharging means or mechanism, which, in the present embodiment, comprises the lever 202, fixed to the post 203, the latter being suitably journaled for rotation in the stationary frame 204 and held in normal position against the stop 205 by means of the coil spring 206. Each letter pocket or receptacle has its corresponding discharging lever, the latter being arranged at successively different relative points to correspond with the letter pockets or receptacles, and to discharge the letter when the previously adjusted trip arm reaches and engages the respective discharging lever. In the present embodiment there are three hundred twenty-five such discharging levers, corresponding to three hundred twenty-five letter pockets or receptacles, although these may be varied to cover a larger or smaller number of receptacles according to the needs of the machine. The post 203 carries at its upper end the arm 207 which is connected by means of the link 208 to an upstanding arm 209 carried by the member 210 which is pivoted at 211 to the standards 212 and has a downwardly extending portion 213 arranged for engagement with the upstanding portion 173 of the previously described lever 171 mounted on the distributing table. It will be seen that when the trip arm 174 engages the discharging lever 202 the post 203 is rotated, causing the pivoted member 210 to be tilted to the position shown in dotted lines in Figure 17, whereby the lever 171 is rocked and the latch 170, which is operatively connected thereto, is moved from engagement beneath the letter carrier, the latter being thereupon tilted by the action of the springs 169 to the full line position shown in Figures 13, 18 and 19, causing the letter to be discharged into its pocket. Upon further movement of the distributing table, the letter carrier comes into contact with the stationary abutment 214, comprising a roller in the present embodiment, which engages the letter carrier and causes a further movement of the letter carrier or support until it assumes its normal position level with the surface of the distributing table, the latch 170 being moved back to its normal locking position by suitable means common in latch construction during the rotation of the letter carrier, while at the same time the trip arm 174 is returned to its normal position through the action of the parts already described.

Stamping mechanism for the letter pocket.

Arranged for cooperation with each of the discharging levers is a stamping mechanism of suitable form, arranged to mark the letter immediately previous to its discharge with a characteristic or identifying stamp to indicate the pocket or receptacle in which it is received, and to this end, in the present embodiment, the standards 212 are provided with a laterally extending casing 215 within which is rotatably supported the fixed shaft 216 surrounded by a loosely mounted sleeve 217 which carries the stamping member 218 at its outer end, the latter being provided with letter stamping surfaces 219 at each end thereof. Formed centrally of the sleeve 217 are the cam surfaces 220 arranged between the leaf springs 221 which serve to hold said cam surfaces and the stamping member normally in the position shown in full lines in Figures 13 and 19. The leaf springs 221 are suitably held at their ends by the support 222 carried by the casing 215. Fixed to one end of the sleeve 217 is the ratchet wheel 223 and rotatably mounted on the sleeve 217 adjacent to the ratchet wheel 223 is arranged the collar 224 which carries a spring pressed pawl 225 adapted to engage the teeth of the ratchet wheel 223. A coil spring 226 connected to the collar 224 and to the casing 215 respectively, serves to retain said collar 224 in its normal position, as shown in Figures 13 and 17, movement of the collar being effected in any suitable manner by the operation of the letter discharging lever, the means in the present instance comprising a flexible connection 227 leading from said collar to an ear 228 extending from the upper part of the pivoted member 210, said flexible connection being guided around a pulley 229 mounted upon one of the standards 212. In this manner, upon the operation of the discharging lever 202 the collar 224 is rotated causing the pawl 225 to engage the ratchet wheel 223 and to turn the sleeve 217 against the resisting tendency of the springs 221, the sleeve being rotated a sufficient distance to enable the letter to be stamped by one end of the stamping member and to move the cam surfaces 220 beyond the dead center so that upon the release of the collar 224, the springs 221 acting upon the cam surfaces 220 will rotate the sleeve 217 the remaining distance to complete a half turn and bring the parts to the normal position shown in Figures 13 and 17. Suitable means may be provided for inking the stamping surfaces at each operation, and to this end, in the present embodiment, there are provided inking rolls 230 which are journalled in the arms 231 pivotally mounted near the ends of the stamping member 218. Connected to the arms 231 are springs 232 which are secured at their opposite ends to a pin 233 carried by a stationary arm 234 which is mounted upon the shaft 216. By this construction, the inking rolls normally take the position shown in full lines in Figures 13 and 19, and when the stamping plunger is turned by the devices already described, the springs 232 cause the inking rollers to be moved across the stamping surfaces, alternately, at each operation of the stamping member.

The setting up mechanism for adjusting each selective mechanism to any one of the three hundred and twenty five set ups required in the embodiment illustrated.

In order to effect operation of the setting levers on the distributing table, to adjust the trip arms, there are provided, in the present embodiment, a pair of actuating members, preferably in the form of cam guides 235 and 236 which cooperate with the setting levers 188 and 181, respectively, to move the latter to the desired positions according to the extent of movement of the cam guides, which is effected in a manner that will now be described. The guide 235 is pivotally supported in suitable standards on the frame and connected by the link 237 to the crank arm 238 mounted on the rock shaft 239. Fixed on the shaft 239 near the opposite end thereof is the crank arm 240 to which is pivoted the connecting rod 241, the latter being in turn connected to arm 242 fixed upon the rock shaft 243 which carries a series of fixed operating arms 244 arranged successively at different elevations, as shown in Figure 12, so as to secure a varied throw of the rock shaft 243 according to the particular operating arm that is moved. The guide 236 is pivotally connected by link 245 and crank arm 246 to the rock shaft 247 which carries near its center the crank arm 248 pivoted to a connecting rod 249 which in turn is pivotally connected to the arm 250, the latter being fixed upon a rock shaft which is in alinement with the previously mentioned rock shaft 243 and carries a series of operating arms 251 arranged successively at different elevations, as shown in Figure 11. In the present embodiment, there are eight of the operating arms 244 and thirty-six of the operating arms 251, the first mentioned series permitting eight different positions for the cam guide 235 and the other series permitting thirty six different positions for the cam guide 236, said guides serving to effect the desired vertical and lateral adjustment of the trip arm on the letter distributing table. By the combined action of the two series of operating arms just mentioned, provision is made in the present embodiment for three hundred and twenty-five different adjustments of the trip arms on the distributing table, so that the letters may be distributed in any one of three hundred and twenty-five pockets. That is to say, thirty-six adjustments may be obtained by the actuation of any one of the larger, or primary series of operating arms 251, and two hundred and eighty-eight additional adjustments of the trip arms may be obtained by the combined action of the primary series and secondary, or smaller, series of operating arms 244, there being one additional pocket provided for receiving letters which pass by the operator unnoticed, the trip arms being arranged to effect discharge of a letter into such pocket when neither one of the cam guides are actuated, that is to say, no operation of the operating arms 251 or 244 takes place. In order to effect movement of the operating arms there is provided, in the present embodiment, a keyboard comprising keys 252, thirty-six in number, corresponding to the thirty-six operating arms of the primary series, and foot actuated treadles 253 corresponding to the eight operating arms of the secondary series. It will be noted, as shown in Figures 2 and 21, that each foot of the operator controls four treadles for up and down, and right and left movements, each of the treadles being connected to one of the levers 254, the previously mentioned keys 252 being arranged on similar levers, the last mentioned levers being pivotally connected to plungers 255 which are provided with curved lower end portions 256. Arranged for cooperation with the plungers 255 are two sets of an equal number of levers 257 which are movably mounted, above and below, on the continuously rotating frame 258. Each lever 257 comprises a positioning member 259 arranged for engagement by one of the plungers 255, an operating member 260 arranged to cooperate with one of the operating arms 244, and a resetting member 261 for engagement with the stationary resetting bar 262 for returning the lever to its normal position during the rotation of the lever frame. Figure 12 shows one of the key operated plungers in depressed position and in engagement with the corresponding lever 257 which is about to be rotated on its pivot, so as to bring the operating member 260 into position for cooperation with the corresponding operating arm 244, such cooperation and releasing movement of the operating arm 244 being brought about by the continued rotation of the lever carrying frame 258. After the operating arm 244 is moved downwardly, to effect the desired positioning of the cam guide, further rotation of the lever carrying frame brings the lever into engagement with the resetting bar 262 whereby it is moved back to its normal position, and ready for another operation. At each rotation of the lever carrying frame, one or two of the levers on said frame are turned, by the operation of one of the keys of the keyboard, or by the combined operation of a key and a treadle, according to the particular pocket or receptacle in which it is desired to discharge the letter, which is to be determined by the operator of the machine who can inspect each letter as it passes him. The lever frame 258 carries the integral sleeves 263 pivotally mounted on bearings 264. One of said sleeves 263 has fixed thereto a gear wheel 265 meshing with the pinion 266 which carries a bevel pinion 267 arranged to engage a corresponding bevel pinion 268 fixed upon the upper end of the shaft 269 which is geared to the main power shaft 27 by means of the cooperating pinions 270 and 271, whereby continuous rotation of the lever carrying frame 258 is effected. In order to secure locking of the plungers 255, and to prevent accidental actuation of any others than those intended to be moved, there is provided, in the present embodiment, a convenient form of locking device comprising a bar 272 arranged for slidable movement back and forth for engagement beneath the stops 273 formed on the plungers 255, as shown clearly in Figure 12. The locking bar 272 has pivoted thereto the bell crank 274 which is suitably mounted, and has its other arm fixed to the bar 275 arranged in the path of movement of the stops 273, and extending entirely across the keyboard. Figure 12 shows the locking operation, one of the stops 273, shown in dotted lines, having engaged the bar 275 in its downward movement, rocking the bell crank 274 and having moved the locking bar 272 forwardly, in which position it is engaged beneath the remaining stops 273 to prevent accidental movement of any of the plungers. The locking device is returned to normal unlocking position upon the return of the parts, by means of actuating rods 276 carried by the eccentrics 277 which are arranged on the sleeves 263, so that as the lever carrying frame rotates, said operating rods will be moved upwardly to engage the bar 275, and effect the return of the bar 272 and plungers 255 to their normal position. In the present embodiment 278 designates a seat provided for the operator, who takes his position in front of the keyboard frame 279, where he can inspect the letters as they pass on the distributing table, and can control the keyboard, the treadles, and the transmission gearing levers.

In the particular embodiment illustrated, the mail or other units to be distributed, are successively dropped from the overhanging belts 49 onto the distributing conveyer while that conveyer is moving thereby establishing the conveyer loading or receiving station located below the lower end of the feed conveyer that embodies said two belts 49 (Figs. 1, 4, 12). The continued forward movement of the conveyer successively carries each unit beyond the feed conveyer and into the view of the operator located on seat 278, so that the operator can inspect the address of the unit and manipulate the manually controlled devices to adjust one or both of the setting up guides 235, 236, to the required extent determined by the address of the unit, before the particular selective mechanism setting levers 181, 188, corresponding to that unit, reach said guides, thereby defining a portion of the endless path of each mail unit mover or carrier of the distributing conveyer while traveling which the mail unit on such carrier is exposed to the view of the operator for inspection. In this connection, it will be noted, that the various driving gear controlling hand levers are within convenient reach of the operator's station so that he can quickly and at any time stop the movement of the distributing conveyer, or if so desired, the operator can by hand remove any mail unit from or rearrange a mail unit on the distributing conveyer while such unit is moving forward from belts 49 and before reaching the postmarking mechanism 43.

It will also be noted, that the mail unit distributing conveyer, continues its forward movement while receiving and discharging such units, and that said conveyer receives the mail units successively and may at any one time be propelling a large number of such units from the loading station to various discharge stations, yet the units are discharged from the conveyer without regard to the order in which such units were received by the conveyer, and that the units are discharged from the conveyer and dropped into boxes at the discharge stations through the medium of tilting supports on which the units rest, and that the discharge mechanism controlling the tilting of such supports are mechanically and positively actuated by the forward movement of the distribupting conveyer through the medium of the selective devices carried by said conveyer and that the forward movement of said conveyer supplies the power to move the selective devices to set up positions, to move the discharging mechanisms to cause discharge of the mail units, and to tilt the said supports (in this instance to tilt said supports back to mail unit carrying position after each discharging tilt).

It will also be noted that, in the particular embodiment illustrated, the continuously moving distributing conveyer propels each mail unit without clamping or positively grasping such unit and that such units are propelled from the loading or receiving station almost directly to and over the row of boxes or discharge stations without being required to pass along a greatly extended path of movement before reaching such boxes.

In this embodiment, the mechanisms controlling the discharge of letters from the conveyer are arranged along the series of discharge stations, and are identical except that each embodies an operating member (lever 202) that is distinctively positioned with respect to the corresponding operating member of the remaining mechanisms. The portion of each member 202 that cooperates with the selective devices moving with the conveyer, is positioned vertically or horizontally different from such portion of every other number and hence as there are in this instance three hundred and twenty five such numbers, we have such portions occupying three hundred and twenty five different positions.

Each selective device or mechanism of the conveyer, in this embodiment, is hence capable of adjustment to three hundred and twenty five different set ups, so as to bring the effective portion or portions thereof to a position to engage and operate any one of the members 202. In this embodiment, each selective mechanism, embodies the selector or trip arm 174 adjustable vertically and horizontally to any one of said set ups, and the setting levers 181, and 188, one controlling the vertical and the other, the horizontal adjustment of said arm.

The setting up mechanism, in this instance controlled by manually actuated levers 254, embodies the cam guide 235 for the setting levers 188, and the cam guide 236 for the setting levers 181.

In the particular example illustrated, the levers 254 that control one of the cam guides are equipped with finger keys 254 while those that control the other cam guide are operated by foot levers, but I do not wish to so limit my invention. Various set ups can be attained by operating one or the other of said cam guides, and the remaining set ups by operating both guides to various positions.

It will be understood that while I have disclosed in this application a particular embodiment of the invention, comprising definite methods of operation for the several elements of the machine, I do not limit myself in any sense to the exact construction and arrangement of parts herein shown and described, but intend to cover by the present application any modifications or departures that may come within the general scope and purview of the invention, as comprehended by the claims hereinafter.

I claim as my invention:—

1. In a mail assorting machine, the combination with a rotary distributing device, having its entire supporting surface arranged substantially in a horizontal plane and adapted to successively receive and to carry flatwise a plurality of letters, of keyboard controlled selective mechanism for effecting discharge of letters from the distributing device at different points.

2. In a mail assorting machine, the combination with a rotary distributing device, having its entire supporting surface arranged substantially in a horizontal plane and adapted to successively receive and to carry flatwise a plurality of letters, of delivering means for supplying letters to the distributing device, and keyboard controlled selective mechanism for effecting discharge of letters from the distributing device at different points.

3. In a mail assorting machine, the combination with a rotary distributing device, having its entire supporting surface arranged substantially in a horizontal plane and adapted to successively receive and to carry flatwise a plurality of letters, of delivering means for supplying letters to the distributing device, a feeding device leading to the delivering means, and keyboard controlled selective mechanism for effecting discharge of letters from the distributing device at different points.

4. In a mail assorting machine, the combination with a distributing device comprising a rotary table adapted to successively receive and to carry a plurality of letters, of keyboard controlled selective mechanism for effecting discharge of letters from the rotary table at different points.

5. In a mail assorting machine, the combination with a distributing device comprising a rotary table adapted to successively receive and to carry a plurality of letters, the table being provided with a plurality of discharging letter supports, of keyboard controlled selective mechanism for effecting discharge of the letters from the supports at different points.

6. In a mail assorting machine, the combination with a distributing device comprising a rotary table adapted to successively receive and to carry a plurality of letters, the table being provided with a plurality of discharging letter supports, of delivering means for supplying letters to the distributing device, and keyboard controlled selective mechanism for effecting discharge of the letters from the supports at different points.

7. In a mail assorting machine, the combination with a distributing device comprising a rotary table adapted to successively receive and to carry a plurality of letters, the table being provided with a plurality of discharging letter supports, of delivering means for supplying letters to the distributing device, a feeding device leading to the delivery means, and keyboard controlled selective mechanism for effecting discharge of letters from the supports at different points.

8. In a mail assorting machine, the combination with a distributing device comprising a rotary table adapted to successively receive and to carry a plurality of letters, the table being provided with a plurality of tiltable letter supports, of keyboard controlled selective mechanism for effecting tilting of the letter supports and discharge of the letters at different points in a horizontal plane.

9. In a mail assorting machine, the combination with a distributing device comprising a rotary table adapted to successively receive and to carry a plurality of letters, the table being provided with a plurality of tiltable letter supports, of delivering means for supplying letters to the distributing device, and keyboard controlled selective mechanism for effecting tilting of the letter supports and discharge of the letters at different points in a horizontal plane.

10. In a mail assorting machine, the combination with a distributing device comprising a rotary table adapted to successively receive and to carry a plurality of letters, the table being provided with a plurality of tiltable letter supports, of delivering means for supplying letters to the distributing device, a feeding device leading to the delivering means, and keyboard controlled selective mechanism for effecting tilting of the letter supports and discharge of the letters at different points in a horizontal plane.

11. In a mail assorting machine, the combination with a rotary distributing device, having its entire supporting surface arranged substantially in a horizontal plane and adapted to successively receive and to carry flatwise a plurality of letters, of a plurality of letter discharging mechanisms arranged for operative engagement with the distributing device, and keyboard controlled selective devices for operatively positioning said mechanisms relatively to the distributing device.

12. In a mail assorting machine, the combination with a rotary distributing device, having its entire supporting surface arranged substantially in a horizontal plane and adapted to successively receive and to carry flatwise a plurality of letters, of delivering means for supplying letters to the distributing device, a plurality of letter discharging mechanisms arranged for operative engagement with the distributing device, and keyboard controlled selective devices for operatively positioning said mechanisms relatively to the distributing device.

13. In a mail assorting machine, the combination with a rotary distributing device having its entire supporting surface arranged substantially in a horizontal plane and adapted to successively receive and to carry flatwise a plurality of letters, of a series of selective mechanisms carried by said device for effecting discharge of letters from the distributing device at different points, and mechanism for adjusting each selective mechanism independently to any one of several set ups.

14. In apparatus for distributing mail and other units, a series of discharge stations closely arranged along a horizontal path, a series of relatively distinctive discharge mechanisms for said stations, a continuously moving unit conveyer for moving units along said horizontal path and distributing said units to said stations, said conveyer constructed and arranged to simultaneously propel a plurality of units and to discharge each vertically at a predetermined station without regard to the order in which the units were received by the conveyer, a series of selective mechanisms each capable of being set up to cooperate with anyone of said discharge mechanisms to cause discharge of a unit at a predetermined station, and setting up mechanism common to all of said selective mechanisms.

15. In a mail assorting machine, the combination with a distributing device comprising a rotary table, adapted to successively receive and to carry a plurality of letters, of selective mechanisms for effecting discharge of letters from the rotary table at different points, and setting up mechanism for said selective mechanism provided with and controlled by a plurality of movable elements.

16. In a mail assorting machine, the combination with a distributing device comprising a rotary table adapted to successively receive and to carry a plurality of letters, said table being provided with a plurality of discharging letter supports, of selective mechanisms for effecting discharge of the letters from the supports at different points, and setting up mechanism for said selective mechanism provided with and controlled by a plurality of movable elements.

17. In a mail assorting machine, the combination with a distributing device comprising a rotary table adapted to successively receive and to carry a plurality of letters, said table being provided with a plurality of discharging letter supports, of delivering means for supplying letters to the distributing device, selective mechanisms for effecting discharge of the letters from the supports at different points, and setting up mechanism for said selective mechanism provided with and controlled by a plurality of movable elements.

18. In a mail assorting machine, the combination with a distributing device comprising a rotary table provided with a plurality of tiltable letter supports, of manually-controlled selective mechanism for effecting tilting of the letter supports at different points.

19. In a mail assorting machine, the combination with a distributing device comprising a rotary table provided with a plurality of tiltable letter supports, of delivering means for supplying letters to the distributing device, selective mechanism for effecting tilting of the letter supports at different points, and manually controlled setting up mechanism for said selective mechanism.

20. In a mail assorting machine, the combination with a distributing device and delivering means for supplying letters to the distributing device, of a series of receptacles for receiving the letters from the distributing device, a series of letter supports movably mounted on the distributing device, an adjustable trip arm for each letter support, a pair of setting levers and cooperating devices for adjusting each trip arm, a series of discharging levers mounted independently of the distributing device for cooperation with the trip arms, actuating members arranged to engage the setting levers, and key board controlled mechanism for positioning the actuating members.

21. In a mail assorting machine, the combination with a distributing device and delivering means for supplying letters to the distributing device, of a series of receptacles for receiving the letters from the distributing device, a series of letter supports movably mounted on the distributing device, an adjustable trip arm for each letter support, a pair of setting levers and cooperating devices for adjusting each trip arm, a series of discharging levers mounted independently of the distributing device for cooperation with the trip arms, actuating members arranged to engage the setting levers, and mechanism for positioning the actuating members.

22. In a mail assorting machine, the combination with a distributing device and delivering means for supplying letters to the distributing device, of a series of receptacles for receiving the letters from the distributing device, a series of letter supports movably mounted on the distributing device, an adjustable trip arm for each letter support, a pair of setting levers and cooperating devices for adjusting each trip arm, a series of discharging levers mounted independently of the distributing device for cooperation with the trip arms, actuating members arranged to engage the setting levers, and key board controlled mechanisms for positioning the actuating members including a series of arms connected to the actuating members, a revolving frame, and a series of levers movably mounted on the revolving frame for cooperative engagement with the last mentioned arms.

23. In a mail assorting machine, the combination with a distributing device and delivering means for supplying letters to the distributing device, of a series of receptacles for receiving the letters from the distributing device, a series of letter supports movably mounted on the distributing device, an adjustable trip arm for each letter support, a pair of setting levers and cooperating devices for adjusting each trip arm, a series of discharging levers mounted independently of the distributing device for cooperation with the trip arms, actuating members arranged to engage the setting levers, and key board controlled mechanism for positioning the actuating members including a series of arms connected to the actuating members, a revolving frame, a series of levers movably mounted on the revolving frame for cooperative engagement with the last mentioned arms, key actuated plungers for setting the last mentioned levers, and resetting means for restoring the last mentioned levers to normal position.

24. In a mail assorting machine, the combination with a distributing device and delivering means for supplying letters to the distributing device, of a series of receptacles for receiving the letters from the distributing device, a series of letter supports movably mounted on the distributing device, an adjustable trip arm for each letter support, a pair of setting levers and cooperating devices for adjusting each trip arm, a series of discharging levers mounted independently of the distributing device for cooperation with the trip arms, actuating members arranged to engage the setting levers, and key board controlled mechanism for positioning the actuating members including a series of arms connected to the actuating members, a revolving frame, a series of levers movably mounted on the revolving frame for cooperative engagement with the last mentioned arms, key actuated plungers for setting the last mentioned levers, and locking means adapted for cooperation with said plungers to prevent accidental operation of the same.

25. In a mail assorting machine, the combination with a distributing device and delivering means for supplying letters to the distributing device, of a series of receptacles for receiving the letters from the distributing device, a series of letter supports movably mounted on the distributing device, an adjustable trip arm for each letter support, a pair of setting levers and cooperating devices for adjusting each trip arm, a series of discharging levers mounted independently of the distributing device for cooperation with the trip arms, actuating members arranged to engage the setting levers, and key board controlled mechanism for positioning the actuating members including a series of arms connected to the actuating members, a revolving frame, a series of levers movably mounted on the revolving frame for cooperative engagement with the last mentioned arms, key actuated plungers for setting the last mentioned levers, locking means adapted for cooperation with the plungers to prevent accidental operation of the same, and resetting means for restoring the last mentioned levers to normal position.

26. In a mail assorting machine, the combination with a distributing device and a delivering means for supplying letters to the distributing device, of a series of receptacles for receiving the letters from the distributing device, a series of letter supports movably mounted on the distributing device, an adjustable trip arm for each letter support, adjusting devices for controlling the trip arms, a series of discharging levers mounted independently of the distributing device for cooperation with the trip arms, and key board controlled mechanism for actuating said adjusting devices.

27. In a mail assorting machine, the combination with letter distributing device and delivering means for supplying letters to the distributing device, of a series of receptacles for receiving the letters from the distributing device, a series of letter supports movably mounted on the distributing device, an adjustable trip arm for each letter support, adjusting devices for controlling the trip arms, a series of discharging levers mounted independently of the distributing device for cooperation with the trip arms, and key board controlled mechanism for actuating said adjusting devices including a revolving frame and a series of levers movably mounted thereon.

28. Mail distributing apparatus, comprising carriers movable in succession in a circuit past a common loading station and therefrom successively past a plurality of carrier discharge stations, means for delivering units to the carriers while said carriers are moving forward past said loading station, keyboard controlled mechanism controlling the discharge of the units from the carriers to predetermine the stations at which the units are delivered, respectively, said keyboard-controlled mechanism being constructed and arranged to be actuated for each unit after such unit has been delivered to its carrier and while such unit is carried by its carrier to predetermine the station at which such unit will be delivered from its carrier, and means for advancing the carriers along said circuit and without halting at said loading station.

29. In a mail assorting machine, the combination with a distributing device and delivering means for supplying letters to the distributing device, of a series of receptacles for receiving the letters from the distributing device, a series of letter supports movably mounted on the distributing device, an adjustable trip arm for each letter support, adjusting devices for controlling the trip arms, a series of discharging levers mounted independently of the distributing device for cooperation with the trip arms, and key board controlled mechanism for actuating said adjusting devices including a revolving frame, a series of levers movably mounted on the revolving frame, key actuated plungers for setting the last mentioned levers, locking means adapted for cooperation with the plungers to prevent accidental operation of the same, and resetting means for restoring the last mentioned levers to normal position.

30. In a mail assorting machine, the combination with a letter delivering means, of a distributing device adapted to successively receive and to carry a plurality of letters, said device including a pivoted letter support for an individual letter, a spring constantly acting to tilt said support to letter discharging position, a locking device for holding said support in normal position against the tension of said spring, and means to withdraw said locking device to permit the spring to tilt the support.

31. In a mail assorting machine, the combination with letter delivering means, of a distributing device including a pivoted letter support, a spring for tilting the letter support, a locking device for holding the letter support normally against tilting, a discharging member mounted independently of the distributing device and adapted to cooperate with the locking device to effect release of the letter support, selective devices adapted to cooperate with said member, and setting up mechanism.

32. In a mail assorting machine, the combination with a letter delivering means, of a distributing device adapted to successively receive and to carry a plurality of letters, said device including a pivoted letter support for an individual letter, a discharging member mounted independently of the distributing device and adapted to effect tilting of the letter support, and a keyboard controlled selective mechanism for co-operating with said discharge member.

33. In a mail assorting machine, the combination with letter delivering means, of a distributing device including a pivoted letter support, a locking device for holding the letter support normally against tilting, and an abutment arranged to engage the letter support after tilting and to rotate the same on its axis to normal position.

34. In a mail assorting machine, the combination with letter delivering means, of a distributing device including a pivoted letter support, a spring for tilting the letter support, a locking device for holding the letter support normally against tilting, and a manually controlled discharging member mounted independently of the distributing device and adapted to cooperate with the locking device to effect release of the letter support.

35. In a mail assorting machine, the combination with letter delivering means, of a distributing device including a pivoted letter support, a locking device for holding the letter support normally against tilting, a discharging member mounted independently of the distributing device and adapted to cooperate with the locking device to effect release of the letter support, an adjustable trip arm carried by the distributing device for engagement with the discharging member, and locking means for holding the trip arm in adjusted position.

36. In a mail assorting machine, the combination with letter delivering means, of a distributing device, a discharging member mounted independently of the distributing device and adapted to cooperate therewith to cause discharge of letters, an adjustable trip arm carried by the distributing device for engagement with the discharging member, locking means for holding the trip arm in adjusted position, and devices for releasing the last mentioned locking means to permit return of the trip arm to normal position.

37. In a mail assorting machine, the combination with letter delivering means, of a distributing device including a pivoted letter support, a locking device for holding the letter support normally against tilting, a discharging member mounted independently of the distributing device and adapted to cooperate with the locking device to effect release of the letter support, an adjustable trip arm carried by the distributing device for engagement with the discharging member, locking means for holding the trip arm in adjusted position, an abutment arranged to engage the letter support after tilting to rotate the same on its axis to normal position, and devices controlled by the rotation of the letter support for releasing the last mentioned locking means to permit return of the trip arm to normal position.

38. In a mail assorting machine, the combination with letter delivering means, of a distributing device including a pivoted letter support, a discharging member mounted independently of the distributing device and adapted to effect tilting of the letter support, and a trip arm adjustable vertically and horizontally on the distributing device for engagement with the discharging member.

39. In a mail assorting machine, the combination with letter delivering means, of a distributing device, a discharging member mounted independently of the distributing device and adapted to cooperate therewith to cause discharge of letters and a trip arm adjustable vertically and horizontally on the distributing device for engagement with the discharging member.

40. In a mail assorting machine, the combination with a distributing device having a series of discharging letter supports, of a series of discharging members mounted independently of the distributing device and adapted to effect discharge of the letters therefrom, a series of letter stamping mechanisms adapted to be actuated by the movement of the discharging members, and selective mechanism for effecting operation of the discharging members.

41. In a mail assorting machine, the combination with a distributing device having a series of discharging letter supports, of a series of discharging members mounted independently of the distributing device and adapted to effect discharge of the letters therefrom, a series of letter stamping mechanisms adapted to be actuated by the movement of the discharging members, and key board controlled selective mechanism for effecting operation of the discharging members.

42. The combination of a carrier; a series of members movable in conjunction with the carrier and independently of each other; means mounted independently of the carrier, for shifting one of said members into operative position; and means, actuated by said shifted member, for causing the carrier to tilt and discharge its load at a definite point.

43. In combination, in mail distributing apparatus, a continuously moving letter conveyer provided with a series of adjustable selective elements determining the delivery points of the letters from the conveyer, a setting-up mechanism common to all of said elements and for setting the same, a series of manually controlled keys, and operating mechanisms therefrom to said setting up mechanism to determine the position to which the same shall be moved.

44. In combination, in a mail distributing apparatus, a continuously moving letter conveyer, a series of adjustable selective elements determining the delivery points of the letters from the conveyer, means for successively feeding letters to said conveyer, a setting-up mechanism common to all of said elements and for setting the same, a series of manually controlled keys, and operating mechanism therefrom to said setting up mechanism to determine the position to which the same shall be moved.

45. In distributing apparatus, in combination, a unit-propelling and distributing conveyer traveling in an endless circuit, a series of discharge stations arranged along said conveyer, means for successively delivering units to said conveyer, an operator's station, said conveyer constructed and arranged to expose each unit for inspection from said operator's station, after said unit has been delivered to said conveyer, and selective mechanism manually controlled from said operator's station for predetermining the discharge stations at which the units will be delivered, said mechanism arranged to be set to predetermine the unit discharge station after such unit has been delivered to said conveyer.

46. In a distributing apparatus, in combination, carriers, a feeder for successively delivering units to be distributed to said carriers, a series of discharge stations into which said units are to be discharged from said carriers, manually controlled means predetermining the station to which each unit shall be discharged, said carriers constructed and arranged to expose each unit for inspection while passing from the feeder to said series of discharge stations, and to thereby cooperate with said means by enabling the operator to inspect the unit while carried by its carrier and then cause said means to be set to predetermine the discharge point for such unit, and means for propelling said carriers in a circuit from the feeder to and past said stations and back to the feeder.

47. In distributing apparatus, in combination, a distributing conveyer for propelling units to be distributed, said conveyer embodying an endless succession of separate means each adapted to receive a single unit, a series of discharge stations common to all of said means, each station provided with a distinctive discharge mechanism adapted to cause discharge of units from said means, a series of selective devices corresponding to said means and each embodying a member movable in various directions along angularly arranged paths of movement to the various set ups necessary to actuate any one of said discharge mechanisms, and setting up mechanism common to said selective devices.

48. In distributing apparatus, in combination, a unit-distributing conveyer, a series of selective devices for predetermining the stations at which the units will be discharged, setting up mechanism for adjusting the selective devices to the set ups required, and means operating independently of said setting up mechanism for successively feeding units to said moving conveyer.

49. In distributing apparatus, a series of receptacles into which units are distributed, a conveyer for propelling units and distributing the same to said receptacles, unit discharging mechanisms causing discharge of units from the conveyer to the receptacles, each discharge mechanism being distinctive with respect to the remaining discharge mechanisms, and a series of selective devices, each such device being movable vertically and laterally to any set up required to operate any one of said discharge mechanisms.

50. Distributing apparatus, comprising a plurality of carriers traveling in a circuit and each arranged to propel a single unit arranged in a position parallel with the direction of movement of its carrier, means for successively loading units piece by piece to respective carriers, and means positively and mechanically operated by the power of the forward movement of the carriers for causing discharge of the units from the carriers at predetermined stations, and setting up mechanism for predetermining the station at which each unit will be discharged.

51. Distributing apparatus, comprising a plurality of carriers traveling in a circuit, means for separating units to be distributed from a pile and successively propelling said units piece by piece to respective carriers, a drive shaft for said means, means positively and mechanically operated by the power of the forward movement of the carriers for causing discharge of the units from the carriers at predetermined stations, and setting up mechanism for predetermining the station at which each unit will be discharged.

52. In a mail-sorting machine, a continuously travelling conveyer having means for carrying a plurality of individual pieces of mail, means for successively presenting units for distribution by the conveyer, a horizontal row of discharge stations along which said conveyer travels a horizontal path, and selective means positively and mechanically operated by the power of the forward movement of the conveyer for causing the mail units to be automatically unloaded vertically at predetermined stations while travelling along said horizontal path, said selective means being operable for any number of pieces of mail on the conveyer at the same time, without regard to the order thereof.

53. Distributing apparatus wherein units to be distributed are propelled in succession from feeding mechanism and individually discharged at various selected stations, said apparatus characterized by discharging mechanisms for said stations, each mechanism being distinctively arranged, selective devices moving with the units and each capable of being set up to engage anyone of said mechanisms while under forward movement and thereby forcibly move and positively actuate such mechanism by the power of the forward movement of the device, and setting up mechanism common to said devices and constructed and arranged to cause said devices to assume various set ups under the power of the forward movement of the devices, said setting up mechanism comprising a plurality of movable controlling elements corresponding to said stations.

54. Apparatus for distributing mail or other units from a feeder to various selected discharge stations, said apparatus embodying a series of selective devices each embodying several independently movable setting members whereby various selective device set ups can be attained by combinations of movements of said members of said device, and setting up mechanism common to all of said devices.

55. Apparatus for distributing units from a common source to various selected discharge stations, said apparatus embodying a series of selective devices for determining the station at which each unit is discharged, means for propelling said devices in a circuit, each device embodying a member shiftable to various set ups transversely with respect to the direction of movement of the units and in a plane parallel therewith, and setting up mechanism causing said members to thus shift by the power of the forward movement of said devices.

56. Apparatus for distributing units from a common source to various selected discharge stations, said apparatus embodying a series of selective devices for determining the station at which each unit is discharged, means for propelling said devices in a circuit, each device embodying a member shiftable to various set ups transversely with respect to the direction of movement of the units and in a plane parallel therewith, and setting up mechanism.

57. Apparatus for propelling units from a common source and distributing the same to various selected discharge stations, embodying a series of selective devices, means for propelling the same in a circuit, each selective device embodying several members each movable independently to attain various selective device set ups, and setting up mechanism common to all of said devices to move anyone or several of the members of each device.

58. Apparatus for distributing units from a common source to various selected discharge stations, said apparatus embodying means for propelling units forwardly in succession to said discharge stations, unit discharge mechanisms corresponding to said stations and each positively operated to effect a unit discharge by the forward movement of said means, selective devices arranged to positively engage and actuate said discharge mechanisms to operative position by the forward movement of said means, and setting up mechanism arranged to move said devices to various set ups by the forward movement of said means and comprising a plurality of movable controlling members corresponding to said discharge stations.

59. Distributing apparatus for conveying units from a common source and distributing the same to various selected discharge stations, said apparatus embodying a succession of selective devices, means for moving said devices in a circuit, a series of discharging mechanisms having distinctive operating members arranged along said circuit, each selective device capable of being set up to strike and positively move anyone of said members to unit discharging position, each device embodying means movable in different planes to attain various set ups, and setting up mechanism, said devices movable in succession past said setting up mechanism, said setting up mechanism embodying different movable elements all capable of acting in combination on a selective device to cause said movements in different planes to produce a set up.

60. Distributing apparatus for propelling units from a common source and distributing the same to selected discharge stations, said apparatus characterized by a series of discharge mechanisms corresponding to a series of discharge stations, and a series of selective devices determining the station at which each unit will be discharged, each selective device embodying an element movable in planes approximately at right angles to each other to attain various set ups.

61. Distributing apparatus for conveying units from a common source and distributing them to various selected discharge stations, characterized by individual unit supports vertically swingable to discharge units at their selected discharge stations, distinctive discharge mechanisms for causing the unit-discharging swing of such supports and comprising movable lever members, selective devices cooperating with said mechanisms in selecting the station at which each unit will be discharged, and setting up mechanism for said devices.

62. Distributing apparatus for conveying units from a common source and distributing them to selected discharge stations, said apparatus characterized by a series of discharge mechanisms each provided with a distinctively arranged lever operating member, and a series of selective devices for determining the particular station at which each unit will be discharged, said devices arranged to co-operate with said mechanisms to cause discharge of units, each device capable of being set up to forcibly engage and swing the operating member of anyone of said mechanisms.

63. Distributing apparatus for conveying units from a common source and distributing them to various selected discharge stations, said apparatus embodying a series of carriers, each arranged to carry a flat unit in a horizontal position, means to propel said carriers in a circuit past a series of discharge stations, distinctive discharge mechanisms arranged along said circuit, a series of selective devices moving with said carriers and determining the station at which each unit is discharged, setting up mechanism for said selective devices, and a feeder arranged to successively advance units to said carriers to be propelled forwardly thereby while in horizontal or flatwise position.

64. Distributing apparatus for conveying units from a common source and distributing them to selected discharge stations, said apparatus embodying a series of selective devices controlling the distribution of said units, each device having several movable members for attaining the set ups necessary to cause discharge of a unit at any one of said stations, each member movable to any one of several positions, and setting up mechanism comprising means to move one of said members to anyone of said several positions and other means to move another of said members to any one of its several positions.

65. Distributing apparatus for conveying units from a common source and distributing them to selected discharge stations, said apparatus characterized by a series of discharge mechanisms having distinctive operating portions, and a series of selective devices determining the stations at which units are discharged and each having an element movable to a plurality of positions in one direction and also movable to a plurality of positions in another direction to attain any set up required to operatively engage any one of said distinctive operating portions.

66. Distributing apparatus for conveying units from a common source and distributing them to selected discharge stations, said apparatus being characterized by a series of selective devices for controlling the distribution of said units, each device having several movable members for attaining various selective set ups, and setting up mechanism comprising a key board for determining the positions of one of said members of each device, and separate means for determining the positions of another of said members of each device, whereby the number of different selective device set ups capable of being thereby produced exceeds the number of keys in said key board.

67. Distributing apparatus for conveying units from a common source and distributing them to selected discharge stations, said apparatus being characterized by a series of selective devices for controlling the distribution of said units, each device having several movable members for attaining various selective set ups, each of said members being movable to two or more different operative positions to cooperate in attaining various set ups, whereby the total number of set ups thereby attained in each device is greater than the number of said members of said device.

68. Distributing apparatus for conveying units from a common source and distributing them to selected discharge stations, said apparatus being characterized by a series of selective devices for controlling the distribution of said units, each device having several movable members for attaining various selective set ups, and setting up mechanism common to all of said members and comprising a bank of levers, a setting up element movable to several different operative positions to engage and move corresponding members of each device, certain of said levers being arranged to control the positioning of said element, and another setting up element movable to several different operative positions to move other corresponding members of each device, the remainder of said levers controlling the positioning of said last named element.

69. Distributing apparatus comprising a series of receptacles, an endless succession of means for carrying units and distributing the same to said receptacles, mechanism for continuously moving said means in a circuit past said receptacles, a feeder for delivering units one at a time to said means as they move past said feeder, rotary driving means for said feeder, distinctively positioned movable elements moving with said means for causing the discharge of the units from said means and to said receptacles, and selective devices for controlling said movable elements and predetermining the receptacle to which each unit is discharged.

70. In a distributing machine, a continuously moving conveyer for the distribution of units, receptacles to receive the distributed units, continuously moving selective devices to control the distribution of the units, setting up mechanism for said selective devices provided with controlling elements corresponding to said receptacles, and a unit feeder to separate the units and feed them individually to said conveyer while the same is in motion.

71. Apparatus for distributing units from a common source to various discharge stations, comprising a row of discharge stations, a series of carriers movable in an endless path including a horizontal portion along which said stations are arranged for receiving units from said carriers, selective mechanisms for causing discharge of any carrier at any station, and a selective-mechanism-controlling key board arranged beside the horizontal portion of said path so that the carriers move to one side of the key board as they progress forwardly, thereby establishing the operator's station, in front of the key board, to one side of the path in which said carriers move, said apparatus constructed and arranged to successively display the units for inspection by the operator from the operator's station.

72. Apparatus for distributing units from a common source to various discharge stations, comprising a row of discharge stations, a series of carriers movable in an endless path along which said stations are arranged for receiving units from said carriers, selective mechanisms for causing discharge of any carrier at any station, and a selective-mechanism-controlling key board arranged beside said path so that the carriers move to one side of the key board as they progress forwardly, thereby establishing the operator's station, in front of the key board, to one side of the path in which said carriers move, said apparatus constructed and arranged to successively display the units for inspection by the operator from the operator's station.

73. Apparatus for distributing flat units from a common source to various points of distribution, comprising a row of discharge stations, a series of carriers movable in an endless circuit having a horizontal stretch, each carrier arranged to propel a unit while in a flatwise position, a feeder for successively delivering the units from a stack or common source to said carriers, said feeder embodying unit propelling and delivering means arranged above and leading to the carriers and establishing a unit path of movement extending downwardly and forwardly to said horizontal stretch, and selective mechanisms determining the station at which each carrier is discharged.

74. Apparatus for delivering flat units from a common source to various points of distribution, comprising a row of discharge station, a series of carriers traveling in an endless circuit, said carriers movable in succession past said stations and each arranged to propel a unit in a flatwise position substantially parallel with the direction of movement of the carrier, feeding mechanism for successively advancing said units to said carriers in a substantially flatwise position and delivering them forwardly thereto, and selective mechanisms determining the station at which each carrier is discharged.

75. Distributing apparatus characterized by a series of unit-receiving receptacles having inlets closely arranged in a horizontal row, a series of continuously moving means for propelling units along said row of inlets for delivery thereto, mechanism for delivering units to said means, a series of discharge mechanisms for causing discharge of units from said means to selected inlets, a series of selective devices for cooperating with said mechanisms in causing discharge of units, and setting up mechanism for setting up said selective devices to predetermine the points of discharge of the units.

76. Distributing apparatus characterized by a succession of carriers for advancing units and distributing them individually to various receptacles, each carrier arranged to propel a single unit and deliver the same to any one of the receptacles, means for delivering units successively to said carriers while said carriers are advancing, said mean being arranged outside of the path of movement of the carriers, a series of selective devices movable in unison with said carriers for causing the discharge of the unit from any carrier to any receptacle, and setting up mechanism common to said selective devices.

77. Distributing apparatus characterized by a succession of continuously moving carriers moving forwardly to advance units to be distributed and for delivering them individually at selected discharge stations, unit carrying and feeding means for advancing units in a forward direction with respect to the direction of movement of the advancing carriers and delivering the units one at a time to respective advancing carriers, driving transmission for said unit carrying and feeding means, and controlled selective devices for predetermining the discharge stations for the units propelled by the respective carriers.

78. Distributing apparatus characterized by a succession of traveling unit carriers for advancing the units to be distributed to a row of receptacles and each constructed and arranged to deliver a unit to any one of said receptacles while the carriers are advancing, and advancing controlled selective mechanism having a plurality of controlling elements for causing discharge of carriers while in motion at selected receptacles.

79. Distributing apparatus characterized by a succession of single unit propelling carriers moving forward in a circuit past a loading station and a series of receptacles, unit carrying and feeding means for advancing units in the general direction of the forward movement of said carriers and for delivering units one by one to respective carriers while advancing past said loading station, and selective devices for causing discharge of any unit at any receptacle while said carriers are advancing.

80. Distributing apparatus characterized by setting up mechanism embodying driving means and a plurality of movable controlling elements and setting-up-mechanism locking means, means for propelling units to be distributed and causing discharge thereof at selected discharge stations, and selective devices adjustable to various set ups by said setting up mechanism to select the station at which each unit will be delivered.

81. Distributing apparatus characterized by setting up mechanism embodying a plurality of movable controlling elements and locking means to prevent accidental shifting during the selective device setting up operations, means for propelling units to be distributed and causing discharge thereof at selected discharge stations, and selective devices adjustable to various set ups by said setting up mechanism to select the station at which each unit will be delivered.

82. Distributing apparatus characterized by setting up mechanism embodying several selective device shifting members and a plurality of movable controlling elements, a series of selective devices moving forward in succession past said setting up mechanism and each embodying several movable members adapted to engage said shifting members and to be shifted thereby under the power of the forward movement of the selective devices, and means for propelling units to be distributed past a series of discharge stations, the discharge of the units being controlled by said selective devices.

83. Distributing apparatus characterized by setting up mechanism embodying several selective device shifting members and a plurality of movable controlling elements, a series of selective devices moving forward in succession past said setting up mechanism and each embodying several movable members adapted to be shifted thereby to produce any one of several selective device set ups, and means for propelling units to be distributed past a series of discharge stations, the discharge of the units being controlled by said selective devices.

84. Distributing apparatus characterized by setting up mechanism embodying driven means, a drive shaft therefor, and a plurality of movable controlling elements, means for propelling units to be distributed and causing discharge thereof at selected discharge stations, and selective devices adjustable to various set ups by said setting up mechanism to select the station at which each unit will be delivered.

85. Distributing apparatus characterized by a succession of unit carriers for propelling the units and distributing the same to a series of receptacles, unit feeding and delivering means for delivering units to said carriers for distribution thereby, driving mechanism for said carriers and for said means embodying transmission and manual controlling devices whereby the movement of said carriers can be stopped independently of and without stopping the operation of said feeding means, and manually controlled selective devices for determining the receptacle to which each unit is discharged.

86. Distributing apparatus characterized by a series of carriers for propelling units forward and distributing them to various selected receptacles, a series of selective devices for causing discharge of the units at the selected receptacles, means for delivering units to be distributed by said carriers, and setting up mechanism common to said selective devices and embodying a plurality of controlling elements and constructed and arranged to set up the selective device that determines the receptacle to which a unit will be delivered after that unit has been delivered by said means.

87. In combination, in distributing apparatus, a conveyer for propelling units and distributing the same, a series of discharge stations, a series of selective devices determining the discharge points of the units from the conveyer, and setting up mechanism common to said selective devices and comprising selective-device setting-up means, a plurality of controlling elements, and operating mechanism between the same and said setting up means embodying driven means actuated otherwise than by the movement of said controlling elements.

88. Distributing apparatus characterized by setting up mechanism comprising a plurality of movable controlling elements, several movable selective-device setting-up members less in number than said controlling elements and mechanism operatively connecting said elements with said members to control the positions thereof; a conveyer for propelling the units to be distributed and distributing the same to various selected discharge stations; and a series of selective devices set up by said members and thereby determining the stations at which said units are discharged.

89. In apparatus for distributing units, in combination, unit propelling means movable in an orbital path, mechanism for propelling said means in said path, mechanism for loading said means, selective mechanism for causing discharge of a unit from said means at a selected one of various discharge points, and keyboard controlled mechanism constructed and arranged to act on the selective mechanism after said propelling means has left the loading mechanism.

90. In combination, in apparatus for distributing units to various discharge points, a carrier, mechanism for propelling the carrier along its path of movement, mechanism for loading the carrier, selective mechanism for causing the carrier to discharge at any one of said points, and keyboard controlled setting up mechanism constructed and arranged to act on said selective mechanism to select the discharge point for said carrier after the carrier has received its load from said loading mechanism.

91. In combination, in apparatus for distributing units to various discharge points, a unit carrier having a path of movement to a loading station and past said discharge points, means for propelling the carrier along its said path of movement, mechanism for loading the carrier at said loading station, selective mechanism for causing the carrier to discharge at any one of said points, and key-board-controlled setting up mechanism constructed and arranged to act on said selective mechanism after the carrier has moved beyond said loading station, to set the selective mechanism and thereby select the discharge point for the carrier.

92. In combination, in apparatus for distributing units to various discharge points, a carrier, means for propelling said carrier to a loading station and past said discharge points, loading mechanism for delivering a unit to said carrier at said loading station, selective mechanism for causing discharge of the unit from said carrier at one of said points, a keyboard, and keyboard-controlled setting up mechanism for setting said selective mechanism to cause discharge of the carrier at the selected station, said loading mechanism operating independently of said keyboard, said setting up mechanism operating on said selective mechanism after said carrier has received its load from said loading mechanism and exposed the same for inspection.

93. Apparatus for distributing units to various discharge points, characterized by a carrier movable in a circuit and constructed and arranged to expose the unit carried thereby at an inspection station, and keyboard-controlled selective mechanism for causing discharge of the unit at a selected discharge station determined by inspection of the unit after delivery thereof to the carrier.

94. In a mail distributing system, the combination of a carrier continuously moving in a circuit, means for placing individual pieces of mail on the carrier, and an inspecton station where the address of the mail matter may be read after it is placed on the carrier.

95. In a mail distributing means, the combination of a carrier, selective devices movable with the carrier, means for causing the carrier to travel, setting up mechanism past which the carrier may move in such travel, and which is adapted to engage and set the selective device of said carrier to cause it to discharge its load at a predetermined point, a source of power for operating said mechanism, and a keyboard arranged to control the application of such power to said mechanism.

96. Apparatus for conveying and distributing units to various discharge stations, characterized by a moving selective device and having a lock for maintaining the same in set up position, and means for automatically releasing said lock to permit return of the selective device to normal position.

97. In a mail handling machine, the combination with a conveyer, of selectors for controlling the discharge from the conveyer, a divided keyboard, and means controlled by the conjoint action of the parts of the keyboard for setting the selectors.

98. Apparatus for distributing mail comprising a feed chute, a rotatable member designed to receive a letter from said feed chute, a plurality of discharge chutes arranged in a circular series and over which said member rotates, and manually controlled selective mechanism for discharging the letter into a predetermined one of said chutes.

99. In distributing apparatus, the combination with a conveyer, of selectors for controlling the discharge from the conveyer, independently-operated sets of actuating members, and means controlled by the action of said members for setting the selectors, the action of said sets of members being conjoint in bringing about selector set ups.

100. In distributing apparatus, the combination with a conveyer, of selectors for controlling discharge from the conveyer, two sets of manually-controlled independently-operated actuating members, and means controlled by the conjoint action of members of each set for setting said selectors.

101. In distributing apparatus, the combination of means for propelling units to be distributed to various discharge stations, a series of selector devices, each device capable of being set up to cause discharge of a unit at any discharge station, two sets of independently-operated manually-controlled members, and means controlled by the action of said members for setting the selector devices, certain selector device set ups being established by the conjoint action of members of both sets.

102. Distributing apparatus for conveying units from a common source and distributing them to selected discharge stations, said apparatus being characterized by a series of selective devices for controlling the distribution of said units, keyboard controlled mechanism for setting up said devices to predetermine the station at which each unit is to be discharged, each device embodying a member movable by said setting up mechanism to two or more different operative positions in attaining various set ups.

103. Distributing apparatus for conveying units from a common source and distributing them to selected discharge stations, said apparatus being characterized by a series of selective devices for controlling the distribution of said units, each device having several movable members for attaining various selective set ups, each of said members being movable to two or more different operative positions in attaining various set ups, whereby the total number of set ups thereby attained in each device is greater than the number of said members of said device.

104. In distributing mechanism, the combination of a conveyer for conveying the units to be sorted, a series of receptacles arranged beneath the conveyer to receive sorted letters, a letter feeder above the conveyer to feed letters downwardly thereto, setting up devices determining the receptacles into which the letters are sorted from said conveyer, and manually-controlled keyboard mechanism arranged horizontally beside said conveyer, and controlling said setting up devices.

105. In a mail handling apparatus, the combination of a letter-moving conveyer, a series of receptacles arranged beneath the same to receive sorted letters, and a letter discharge controlling keyboard mechanism arranged laterally beside said moving conveyer and adapted to control it to sort the letters into said receptacles.

106. In distributing apparatus; in combination; an endless conveyer; a series of relatively distinctive means for causing delivery of units from said conveyer at selected points; a series of selector devices movable with said conveyer for cooperating with said means to cause delivery of each unit at a predetermined point; each device when set up to select a particular means, being constructed and arranged to positively engage such means and mechanically cause discharge of the unit by the power of the forward movement of the conveyer as said conveyer advances; and keyboard controlled setting up mechanism for said selector devices.

107. Distributing apparatus characterized by a series of unit-receiving receptacles having a row of inlets, a series of moving means for propelling units along said row of inlets for delivery thereto, mechanism for driving said series of moving means, mechanism for delivering units to said means, a series of relatively-distinctive discharge mechanisms for causing discharge of units from said means to selected inlets, a series of selective devices for positively and mechanically cooperating with said mechanisms by the power of the forward movement of said advancing means in causing discharge of units, and keyboard controlled setting up mechanism for setting up said selective devices by the power of said advancing means to predetermine the points of discharge of the units.

108. Distributing apparatus comprising a series of carriers movable in a circuit past a series of discharge stations for conveying units and distributing the same to such stations, a series of selective devices movable with said carriers, for predetermining and controlling the points at which the units will be discharged from the carriers, each carrier being provided with a selective device movable laterally with respect to the path of movement of the carrier to various positions to attain any set up necessary to cause discharge of the unit in said carrier at any one of said discharge stations, and setting up mechanism common to the selective devices of said carriers and embodying laterally movable means to successively shift said selective devices laterally to various set ups.

109. Distributing apparatus comprising a series of carriers movable in a circuit past a series of discharge stations for conveying units and distributing the same to such stations, a series of selective devices movable with said carriers, for predetermining and controlling the points at which the units will be discharged from the carriers, each carrier being provided with a selective device movable laterally with respect to the path of movement of the carrier to various positions to attain any set up necessary to cause discharge of the unit in said carrier at any one of several discharge stations, and setting up mechanism common to the selective devices of said carriers and embodying movable means to shift said selective devices laterally to various set ups.

110. In a mail distributing apparatus, in combination, an endless letter conveyer, means for continuously moving the same, means for successively delivering letters to said conveyer, and mechanical means for predetermining the point of delivery of each letter from said conveyer and actuated by the forward movement of said conveyer to cause delivery of a letter therefrom and comprising a series of similar selective devices carried by said conveyer.

111. The combination of a keyboard, settable selectors, mechanism for setting the same under the control of the conjoint action of a plurality of keys in the keyboard, and discharging mechanism controlled by said selectors.

112. The combination of a keyboard, settable selectors, mechanism for setting the same under the control of the conjoint action of a plurality of keys in the keyboard, and means whereby the setting of said selectors may control the discharge of mail.

113. Distributing apparatus comprising a unit distributing conveyer, keyboard controlled selectors traveling with the conveyer, and conveying means for successively advancing units and delivering them one at a time to said distributing conveyer, said selectors and means being combined, constructed and arranged to require each keyboard operation to cause the setting up of a selector controlling the final distribution of a previously advanced unit, and to cause each such previously advanced unit to be displayed to the view of the operator preparatory to the operator's actuation of the keyboard to set up the selector controlling the distribution of such displayed unit.

114. In combination, an endless conveyer, means for successively delivering articles thereto, a series of devices arranged along the path of said conveyer for causing delivery of articles therefrom at selected points, a series of selective means moving in unison with the conveyer for cooperating with said devices to cause delivery of articles from the conveyer at selected points and keyboard-controlled means whereby said selective means are set to select the delivery points of the articles delivered to the conveyer, each set up selective means positively cooperating with the selected delivery device to cause relative movement by the power of the forward drag of the moving conveyer, said relative movement-causing article delivery.

GEORGE F. WITTUM.

Witnesses:
W. H. McCRYSTLE,
H. A. JOHNSEN.